United States Patent [19]

Lewis et al.

[11] 4,224,667
[45] Sep. 23, 1980

[54] COMMAND QUEUING FOR I/O ADAPTERS

[75] Inventors: David O. Lewis, Rochester; John W. Reed, Pine Island; Gary W. Wallin, Mantorville, all of Minn.

[73] Assignee: International Business Machines Corporation, Armonk, N.Y.

[21] Appl. No.: 954,070

[22] Filed: Oct. 23, 1978

[51] Int. Cl.³ .................................................. G06F 3/00
[52] U.S. Cl. .................................................. 364/200
[58] Field of Search ................................ 364/200, 900

[56] References Cited

U.S. PATENT DOCUMENTS

| | | | |
|---|---|---|---|
| 3,514,758 | 5/1970 | Bennett | 364/200 |
| 3,566,358 | 2/1971 | Hasbrouck | 364/200 |
| 3,623,006 | 11/1971 | Balakian | 364/200 |
| 3,725,864 | 4/1973 | Clark et al. | 364/200 |
| 3,961,312 | 6/1976 | Bodner et al. | 364/200 |
| 3,993,981 | 11/1976 | Cassarino, Jr. et al. | 364/200 |

OTHER PUBLICATIONS

"Priority Interrupt Queuing" by Grant et al.; IBM Tech. Discl. Bulletin, vol. 15, No. 10, Mar. 1973, pp. 3046-3048.

*Primary Examiner*—Errol A. Krass
*Attorney, Agent, or Firm*—Dorsey, Windhorst, Hannaford, Whitney & Halladay

[57] ABSTRACT

In a computer system having: an addressable storage for storing instructions, data and input-output (I/O) commands; a central processing unit (CPU) which fetches and executes instructions; and channel means connecting I/O adapters to the storage and the CPU, an apparatus transfers I/O commands to the I/O adapters whereby the I/O command is either accepted immediately or is queued by the I/O adapter. A queued command is taken up by the I/O adapter when no other data transfer operation is pending. To take up a queued command, the I/O adapter initiates a fetch of the pending command by invoking a standard data-transfer-from-storage sequence. The channel means responds to the fetch initiated by the I/O adapter to send the pending command to the I/O adapter.

6 Claims, 35 Drawing Figures

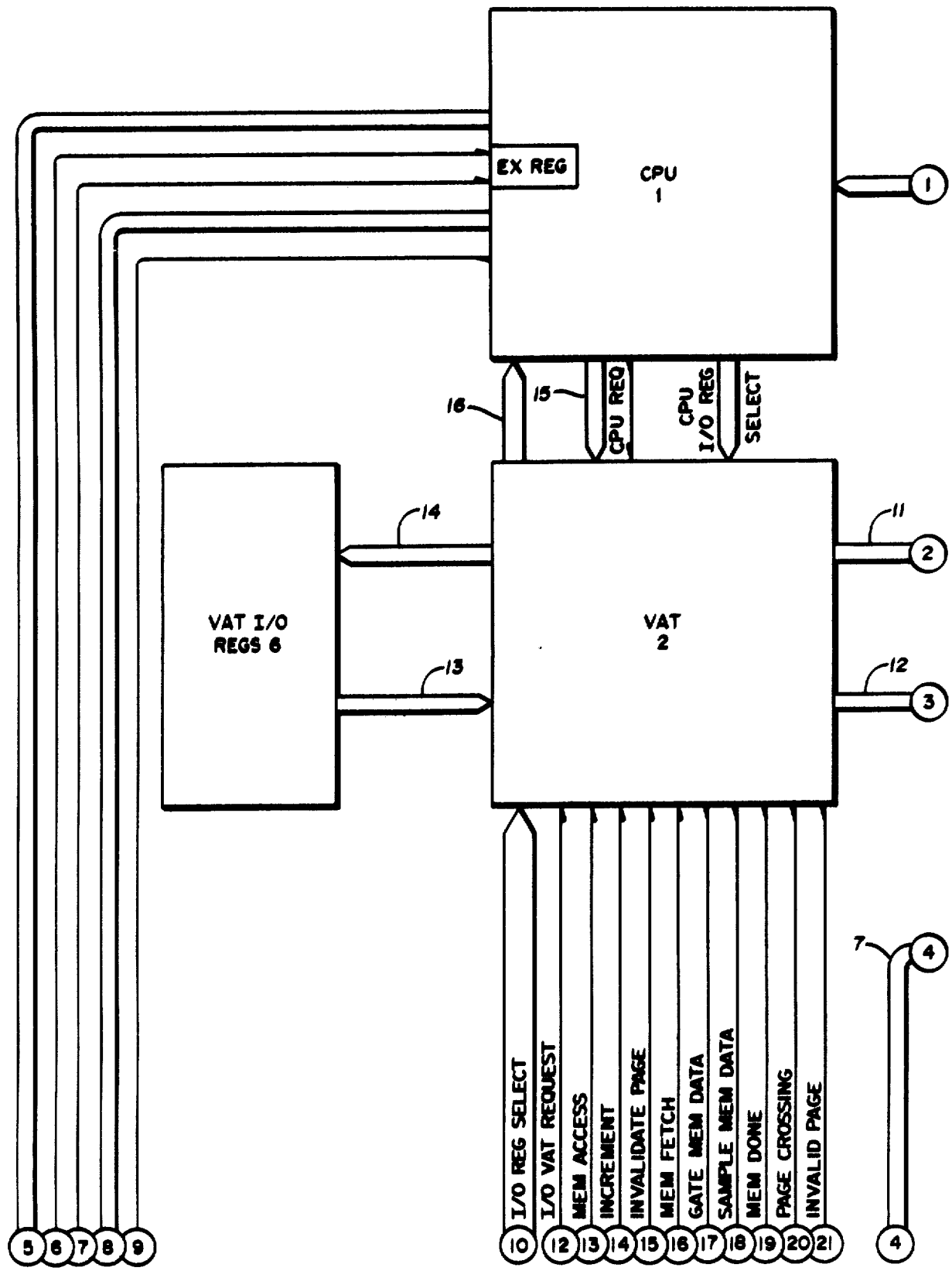

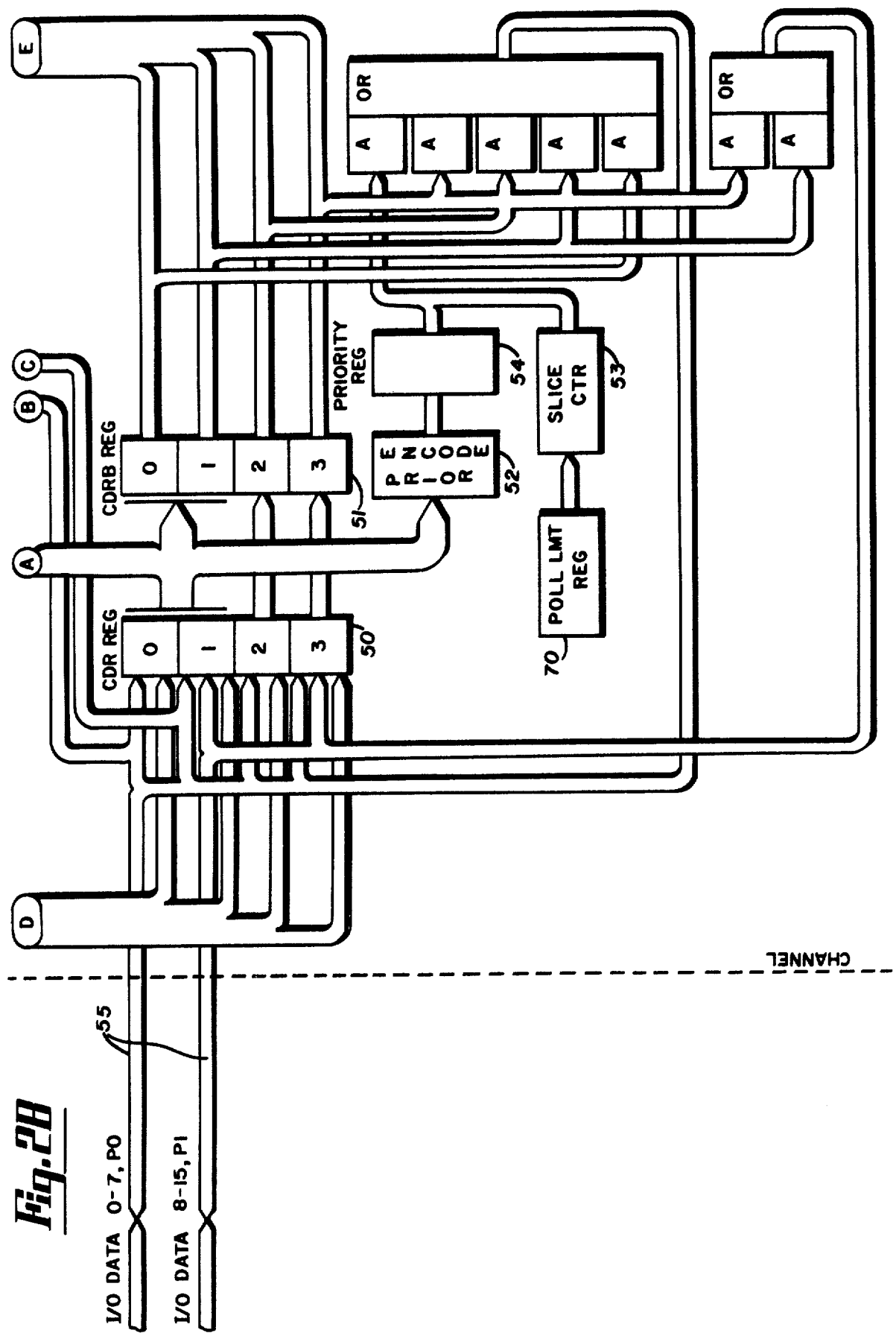

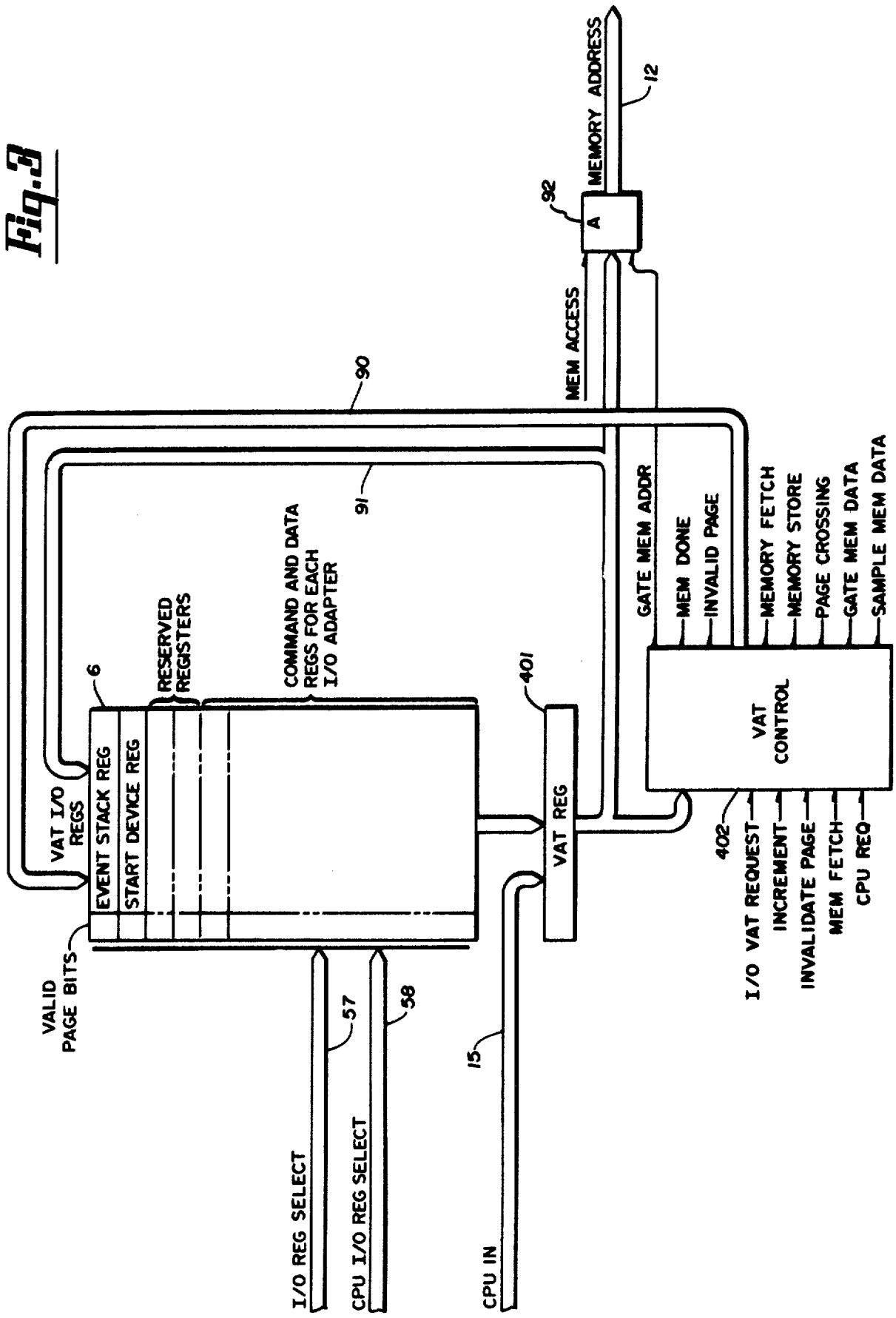

| BITS | CCR BYTE 0 | | | | |
|---|---|---|---|---|---|
| 0 | 0=FUNCTION EVENT | | | 1=MEMORY REQUEST | |
| 1 | IF BIT 0=0 THEN | | | IF BIT 0=1 THEN | 1=DECREMENT<br>0=INCREMENT |
| 2 | | | | | 1=STORE INTO MEMORY<br>0=FETCH FROM MEMORY |
| 3 | | | | | 1=IGNORE PAGE CROSSING |
| 4 | | 1=ALLOCATE PAGE | | | MUST BE 0 |
| 5 | | 1=RESOLVE NEXT PAGE | | | |
| 6 | | 1=COMMAND END | | | |
| 7 | | 1=COMMAND END/FETCH NEXT COMMAND | | | |

| BITS | CCR BYTE 1 |
|---|---|
| 0 | VAT I/O REGISTER DESIGNATION |
| 1 | |
| 2 | BITS 0-7=0 → EVENT STACK REG<br>BITS 0-6=0, BIT 7=1 → START DEVICE REG |
| 3 | BITS 0-5,7=0, BIT 6=1 → RESERVED REG<br>BITS 0-5=0, BITS 6,7=1 → RESERVED REG |
| 4 | |
| 5 | |
| 6 | |
| 7 | |

*Fig. 4*

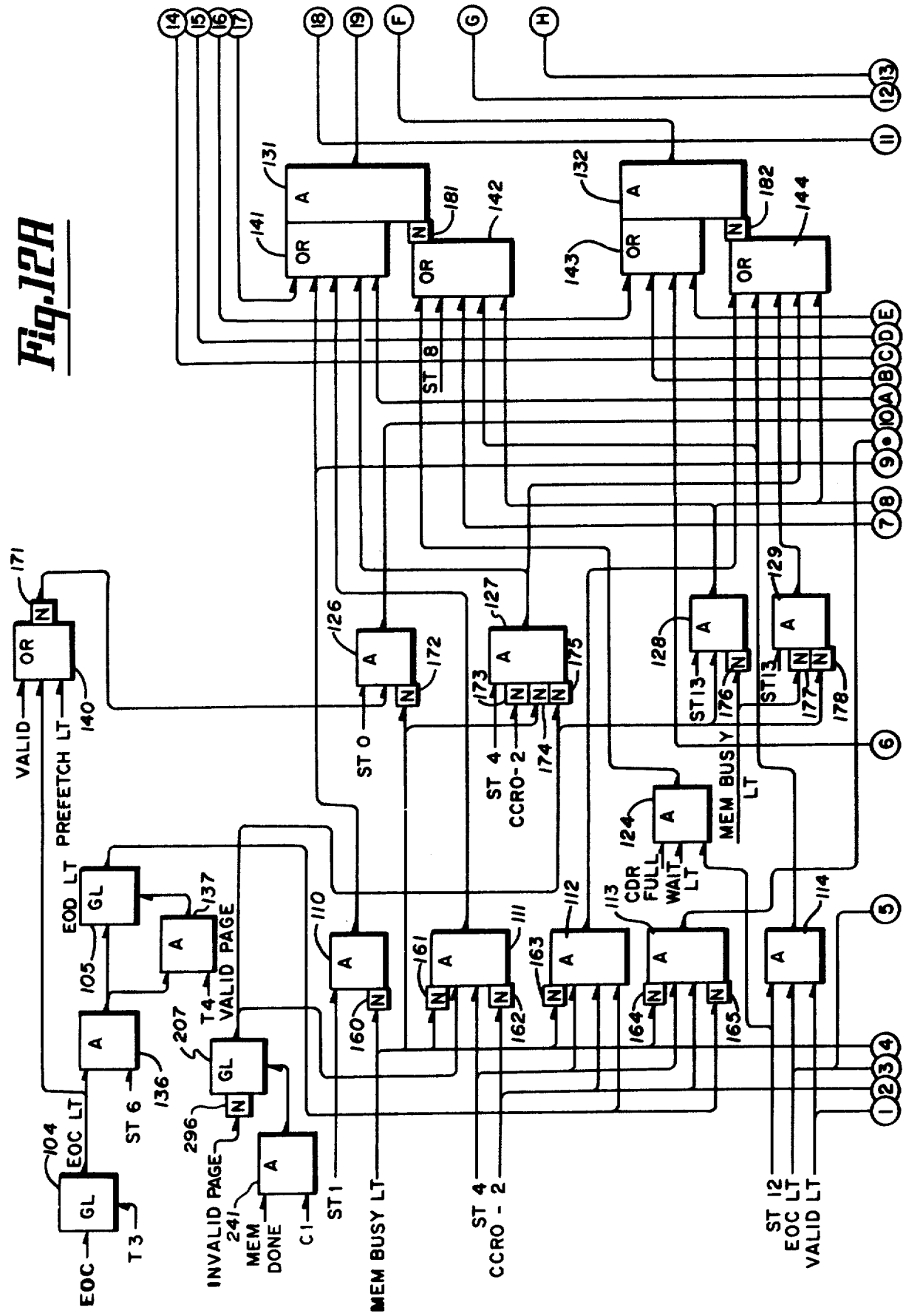

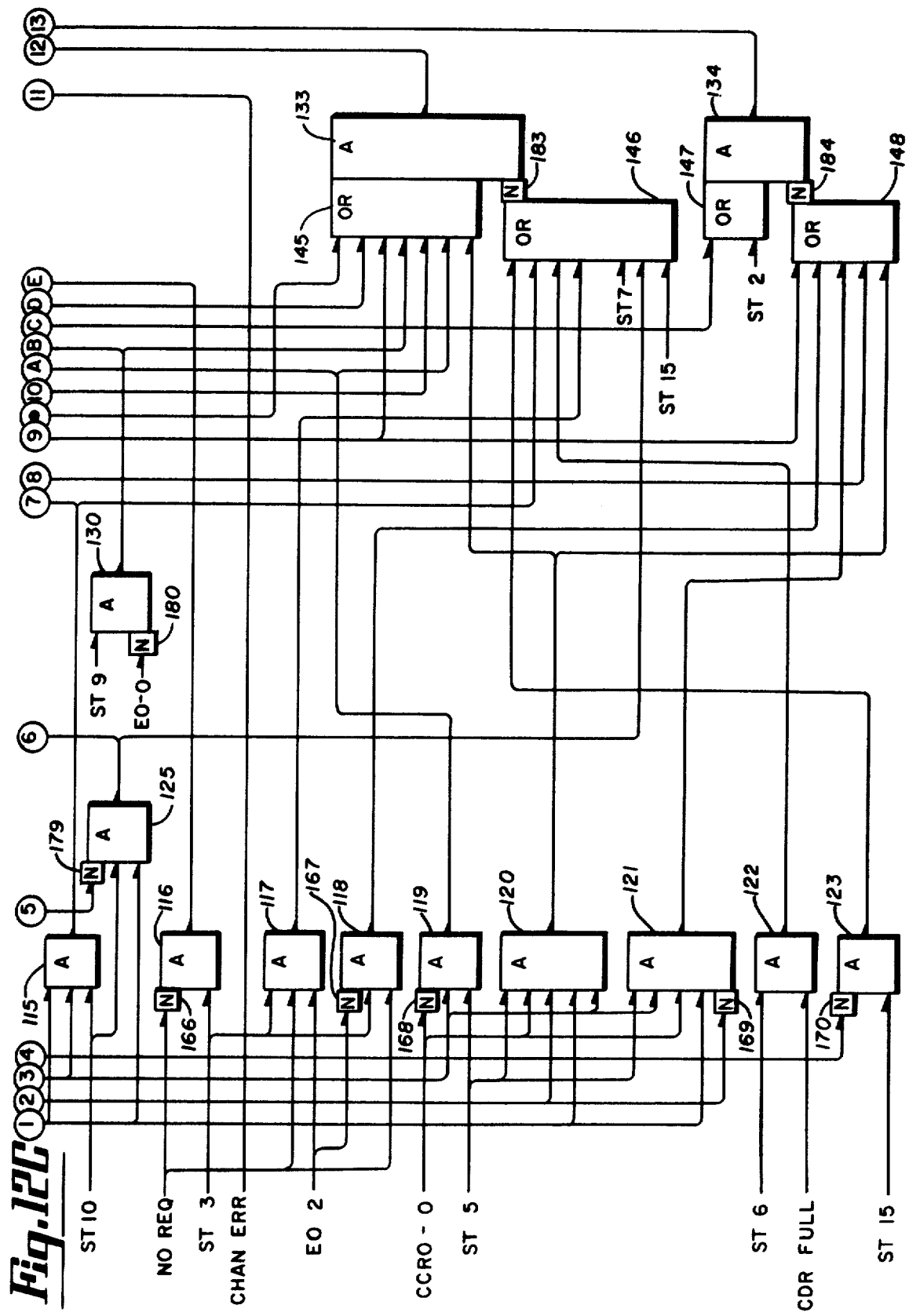

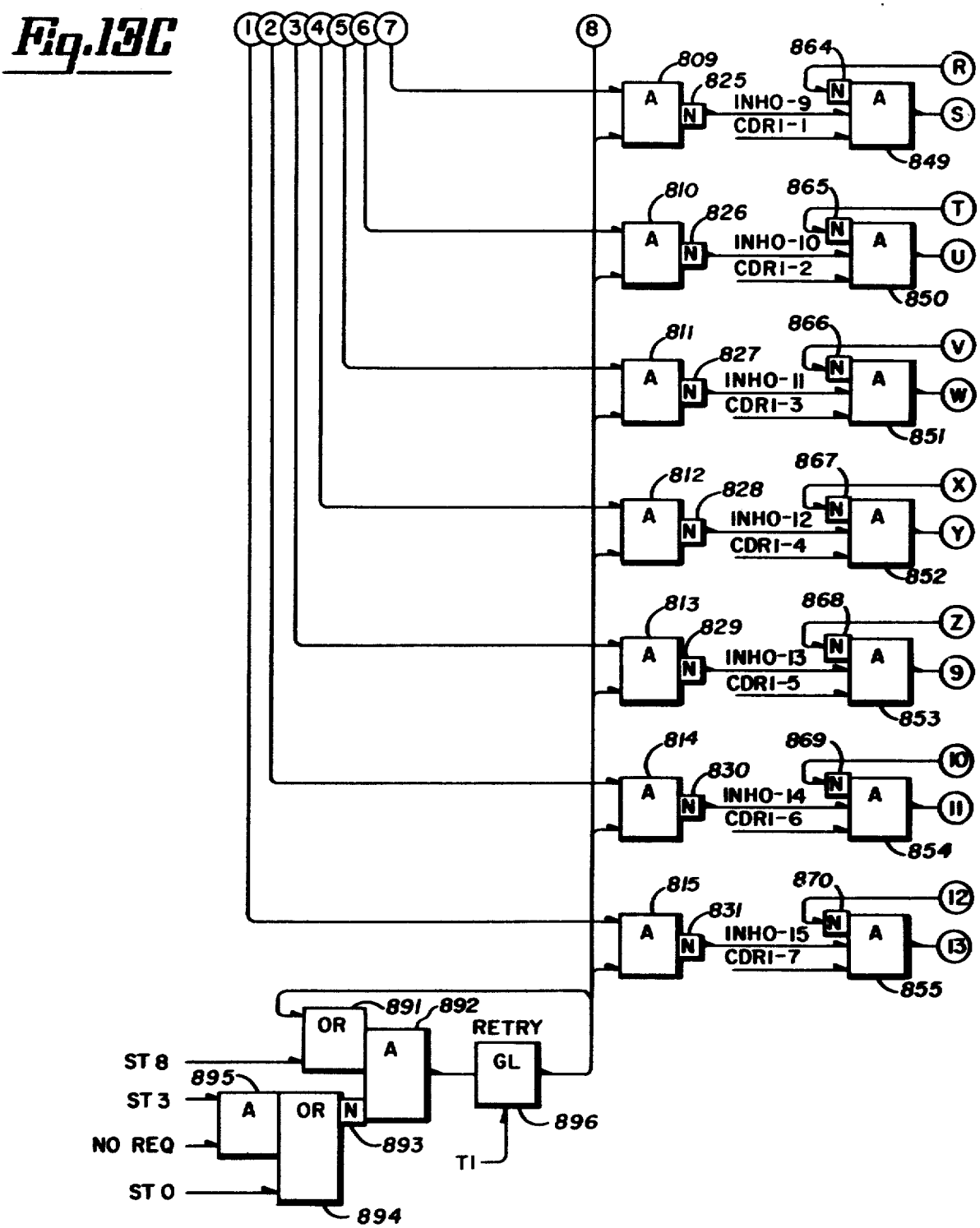

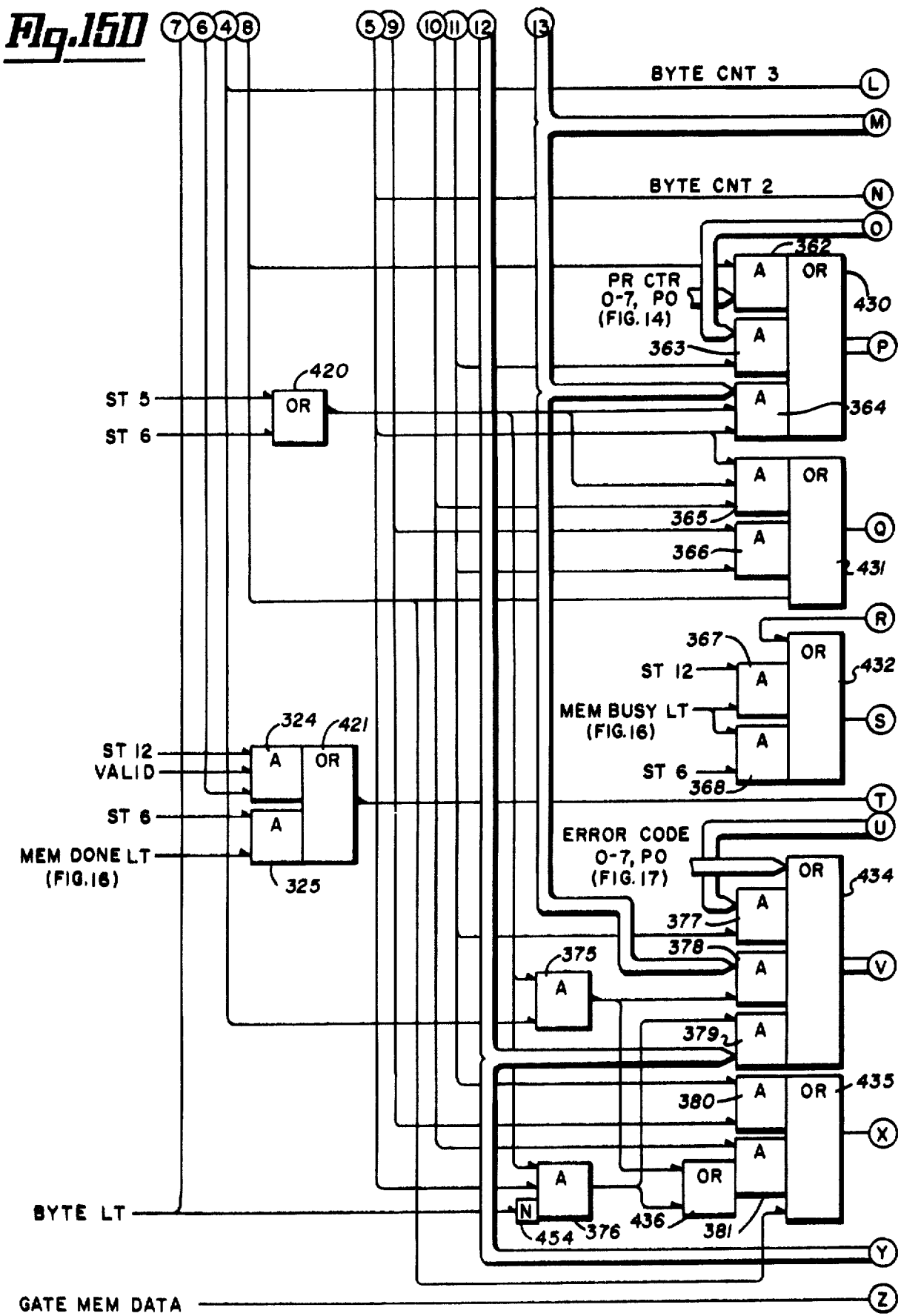

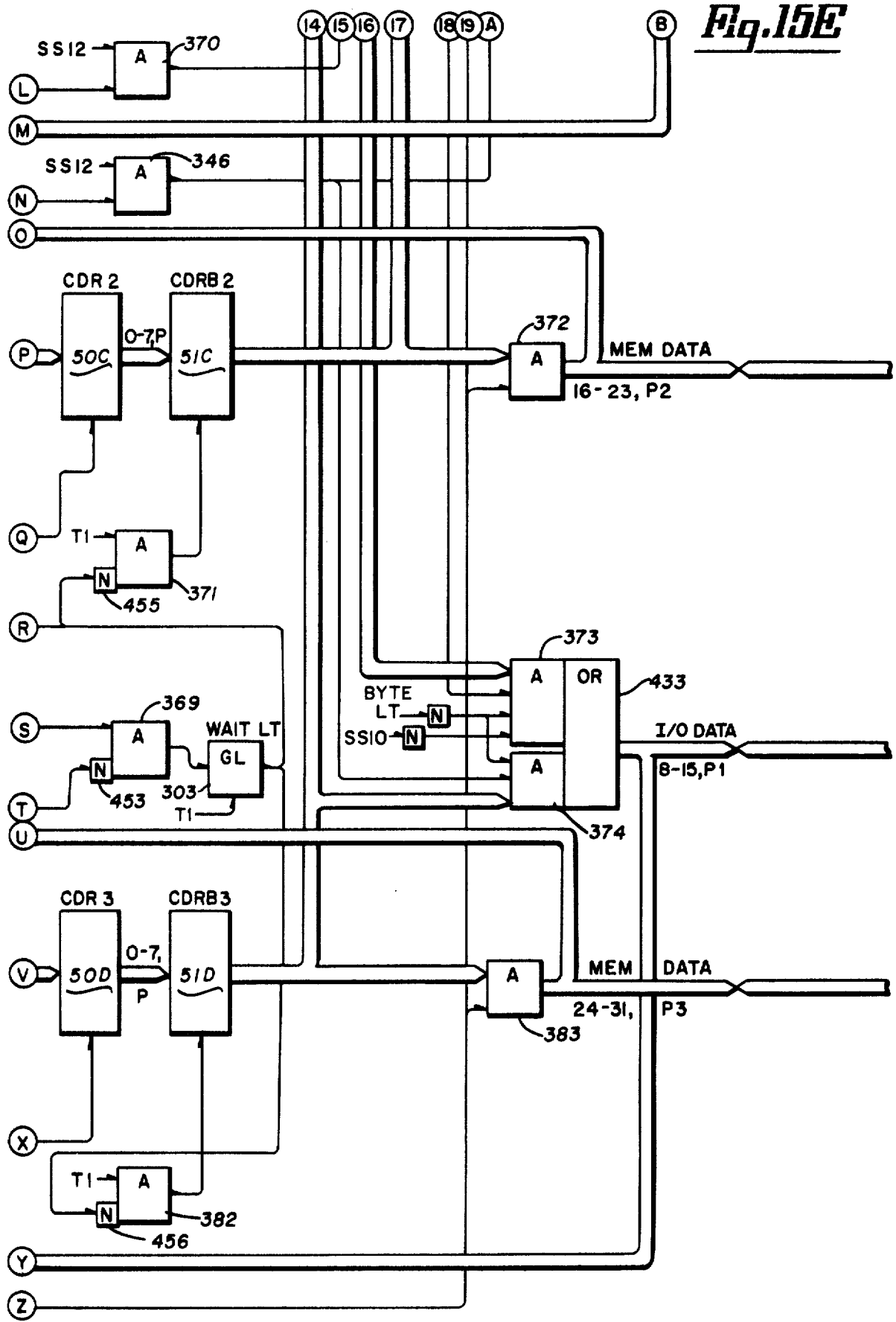

COMMAND QUEUING FOR I/O ADAPTERS

BACKGROUND OF THE INVENTION

1. Field of the Invention

This invention relates to data processing systems employing virtual memory partitioned into pages and having a channel which presents data transfer commands to input-output (I/O) device adapters. More specifically, this invention relates to apparatus for transferring I/O commands which permits an I/O adapter to either immediately accept the command presented to it by the channel or to queue the command so that it can be fetched by the I/O adapter on its own initiative when the I/O adapter is ready to accept and execute the command.

2. Description of the Prior Art

Most I/O channel interfaces are implemented such that an I/O adapter must immediately accept a data transfer command presented to it by the channel. For systems which use low-speed microprocessors to control I/O operations, immediate acceptance of a command requires that the entire channel interface must be implemented in hardware and that the hardware must contain enough buffer space to hold the maximum size command. The cost of additional hardware for command buffering and control can significantly detract from the cost savings possible in a system using low-speed microprocessors to control I/O operations. Moreover, because the I/O microprocessor may control several different types of I/O devices, additional hardware may be required not only for the maximum size command of one type of device, but also for the maximum size command for all of the devices the adapter controls. Alternatively, if command buffering is not available, the I/O microprocessor must be able to dispose of the buffered command for one device before the next device command is sent. The difficulties and the costly solutions associated with these alternatives are the result of the burden which the channel places on the I/O adapter to accept commands immediately, so that the channel is not held up and can continue to perform other operations.

SUMMARY OF THE INVENTION

The present invention provides a means for reducing the I/O adapters' burden of accepting all channel commands immediately, without a significant increase in buffering or control hardware. With the present invention, a channel command can be treated either as an immediate command or a queued command. In the case of an immediate command, the command is taken and executed by the channel and the I/O adapter without delay. In the case of a queued command, the I/O adapter determines not to accept the command immediately. Instead, it stores an indication that a command is pending and later initiates fetching of the queued command for execution.

The principal objects of the present invention are to provide an improved apparatus for transferring I/O commands which: (a) permits an I/O adapter to delay accepting a command presented to it by the channel; (b) allows an I/O adapter which has delayed acceptance of a command to initiate fetching of the delayed command for execution; and (c) simplifies the channel and the I/O adapters by eliminating the need for command resend in the channel and command buffering in the I/O adapters.

BRIEF DESCRIPTION OF THE DRAWINGS

In the accompanying drawings forming a material part of this disclosure:

FIGS. 1A-1C, is a block schematic and flow diagram showing the computer system in which the invention is embodied.

FIGS. 2A-2B, is a block schematic and flow diagram of the channel circuitry incorporating a portion of the invention and showing lines and busses connecting the channel to the CPU, the VAT, the memory and the I/O adapter.

FIG. 3 is a block schematic and flow diagram of the VAT I/O Registers and a portion of the VAT embodying a portion of the invention.

FIG. 4 is a format diagram of bytes 0 and 1 of the Channel Command Register, showing the meaning of various bit configurations of the Channel Command Field.

FIG. 9 is a timing diagram showing the timing of activation of various channel interface lines during an I/O Page Crossing Sequence occurring as a result of a store into memory.

FIGS. 12A-12C, is a detail block schematic and flow diagram of the main sequencing circuitry for the channel.

FIGS. 13A-13D, is a detail block schematic and flow diagram of the Priority Encode in the channel, identified by reference number 52 in FIG. 2.

FIGS. 15A-15E, is a detail block schematic and flow diagram of the channel registers and their supporting circuitry, showing lines and busses connected to the VAT, the I/O adapter and the circuitry of FIGS. 12-14 and 16.

DESCRIPTION OF THE INVENTION

General Description of Operation

Figure 1:
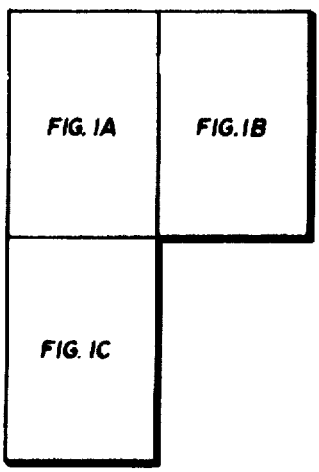
FIG. 1, including

A computer system in accordance with the present invention consists generally, as shown in FIG. 1, of a central processing unit (CPU) 1, a virtual address translator (VAT) 2, an I/O channel 3, an addressable memory or main storage 5 and an I/O device adapter 4. Instructions fetched and executed by the CPU 1, as well as data and I/O commands, are all stored in the addressable memory or main storage 5. These various elements are connected to each other directly and indirectly by means of various lines and busses, which will be discussed in greater detail below and are identified in FIG. 1. The system would typically include a plurality of I/O adapters, but, for simplicity only one is shown in FIG. 1. It will also be understood that the I/O adapter 4 is connected to one or more I/O devices, e.g., magnetic tape drive, magnetic disk drive, not shown here. The I/O adapter 4 is the interface between the channel 3 and the I/O devices. For purposes of the present discussion, the relationship between an I/O adapter and its attached I/O device need not be considered in detail, and generally only the channel-adapter relationship will be described.

Operation of the system in accordance with the present invention can best be described in terms of a group of sequences or protocols which specify certain basic patterns of communication and interaction among the elements shown in FIG. 1. Among the sequences are the following:

Start Channel Sequence—The CPU 1 informs the I/O adapter 4 that a data transfer command is available for execution, i.e. that data is to be moved into or out of the memory 5 via the channel 3.

Channel Poll Sequence—The channel 3 polls the I/O adapters 4 attached to it to determine if any I/O adapter wishes to communicate over the lines and busses connecting the adapters 4 to the channel 3, collectively called the channel interface. An I/O adapter 4 will request the interface to report the outcome of an executed command, to request certain services from the channel 3, and so forth.

Channel Grant Sequence—The channel 3, in response to the request of an I/O adapter 4, connects the adapter 4 to the channel interface to permit data to be transferred to and from the I/O adapter 4.

I/O Interrupt Sequence—The I/O adapter 4, upon completion of processing of a data transfer command from the CPU 1, will request the interface. When the interface is granted to the adapter 4, it reports the status of the command which it processed.

I/O Page Crossing Sequence—The I/O adapter 4, in fetching or storing data, encounters the boundary of a virtual memory page, making it necessary to locate the real storage address of the next virtual page at the boundary.

I/O Disconnect Sequence—When an I/O adapter 4 attempts a transfer to or from a virtual address which has not yet been resolved into a main storage address, the I/O adapter 4 is informed that it cannot proceed and is passed over by the channel 3 until a later round of polling, when it may request resumption of the transfer.

A more detailed exposition of each of the sequences and their relation to each other follows. In this exposition, frequent reference will be made to certain details of the channel 3, which appear in FIG. 2, and of the VAT 2, which appear in FIG. 3. In addition, reference will be made to the format of the Channel Command Register (CCR) containing the Channel Command Field (CCF), a two-byte field, the significance of the bits of which is explained in FIG. 4.

Timing signals which govern the system and the various sequences are generated by five clocks: C1, T1, T2, T3 and T4. C1 is the basic clock, while T1, T2, T3 and T4 produce pulses at one-fourth the frequency of C1. As seen in FIG. 11, the pulses of T1, T2, T3 and T4 are synchronized with C1 and each other such that when T1 matches one pulse of C1, T2 matches the next pulse, T3 the next pulse, T4 the next pulse, T1 the next pulse, and so forth. In the timing diagrams for the various sequences, which appear as FIGS. 6 through 10, the basic cycle corresponds to four pulses of C1. The timing pulses are delivered to the channel 3 from the CPU 1 over the CHANNEL CLOCKS bus, shown in FIG. 1. Use of these timing pulses is discussed in greater detail in the hardware description which appears below.

Start Channel Sequence—The CPU 1 informs the I/O adapter 4 that a data transfer command is pending, by means of a sequence of communications called the Start Channel Sequence. For purposes of communication between the channel 3 and the CPU 1 in this sequence, a series of I/O address registers, identified as the VAT I/O Registers 6, associated with the VAT 2 (FIG. 1), are used. The VAT I/O Registers 6 include, as shown in FIG. 3, an Event Stack Register, a Start Device Register, two reserved registers and a number of other registers which constitute I/O command registers and I/O data registers for each I/O adapter used in the system. The particular register to be used by the VAT 2 is designated by a code number transmitted to the VAT 2 on the I/O REG SELECT bus 57 or the CPU I/O REG SELECT bus 58. The code for the Event Stack Register is hexadecimal '00'. The code for the Start Device Register is hexadecimal '01'. Higher code numbers designate the reserved registers and data and command registers for various I/O adapters 4. The Start Channel Sequence starts with the CPU 1 loading the address of an I/O command into a designated I/O command register and the address of the data to be transferred into a designated I/O data register, both found in the array of VAT I/O Registers 6 (FIG. 3). The CPU 1 also loads the Start Device Register with the address of the I/O command. This address is used to communicate to the channel 3 the device or I/O adapter address of the I/O adapter 4 to which the CPU 1 wishes to communicate the data transfer command. Thus, the Start Device Register and the designated I/O Command Register contain the same address. In the following, an I/O command eight bytes in length will be used as an example.

The CPU 1 loads the various VAT I/O Registers 6 using the busses 15, 58 and 91, the VAT Register 401, and the CPU REQ line. After loading the VAT I/O Registers for the I/O adapter 4, the CPU 1 loads the EO Register in the channel control 60, shown in FIG. 2, by means of the EO DATA bus and the LOAD EO line. The EO Register is interrogated by the channel control 60 and when it is found to be loaded, this informs the channel control 60 that a command is pending for the I/O adapter 4.

Figure 2:
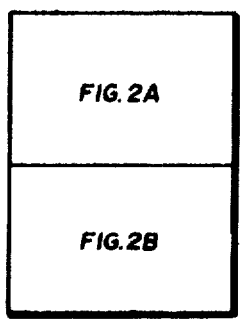
FIG. 2, including

Referring now to FIGS. 1, 2 and 3, in response to the EO Register being loaded, the channel control 60, which includes means for accessing memory 5 at addresses specified in the VAT I/O Registers 6, activates the I/O VAT REQUEST, MEM ACCESS, MEM FETCH and INCREMENT lines to the VAT 2. The channel control 60 then gates to the VAT 2 instructions to select the Start Device Register (i.e., hexadecimal '01') by means of the I/O REG SELECT bus 57. The Start Device Register will be used by the VAT 2 to fetch from memory 5 the device address for the I/O adapter 4 to which the CPU 1 wishes to communicate. The I/O VAT REQUEST line, along with the I/O register code sent on the I/O REG SELECT bus 57, cause the VAT 2 to select an I/O register from the VAT I/O Registers 6. Each I/O register in the VAT I/O Registers 6 (shown in FIG. 3) contains a resolved memory address, i.e., the real address of a page in memory 5, (as opposed to a virtual address of a page which may or not be in memory 5), and a bit called a Valid Page bit. When the Valid Page bit is on, this means that the memory address is valid and can be used by an adapter. If the Valid Page bit is off, the address is invalid and no longer available for use by an adapter. Memory 5 (or main storage) is arranged into 512-byte pages; when the address in a VAT I/O Register is incremented or decremented outside the 512-byte range of a page, the Valid Page bit is reset to invalid (off). In response to the channel 3 activating the I/O VAT REQUEST line and designating the Start Device Register, the VAT 2 reads out into the VAT Register 401 (FIG. 3) the Start Device Register, containing the memory address of the command for the I/O adapter 4. By convention, the first byte of the command is always the device address of the I/O adapter 4 to which the CPU 1 wishes to communicate; the remainder is command data. From the VAT Register 401, the command address is gated to the memory 5 via the MEMORY ADDRESS bus. Because the MEM FETCH line from the channel 3 to the VAT 2 is active, the VAT 2 activates the MEMORY FETCH line to the memory 5. The VAT control 402, (which includes means for incrementing and decrementing addresses) then increments the address in the VAT Register 401 by four, because the INCREMENT line is on, and stores the incremented address back into the Start Device Register, by means of the bus 90.

The memory 5 fetches the data using the (unincremented) address from the VAT Register 401 and places that data on the MEMORY DATA bus (FIGS. 1 and 2). When the VAT 2 turns on the SAMPLE MEM DATA line to the channel 3, the data on the MEMORY DATA bus 7 is gated into the CDR Register 50, shown in FIG. 2. The MEMORY DATA bus 7 is a 36 bit bi-directional bus, implying that data can be sent from the CPU 1 or the channel 3 to the memory 5, or from the memory 5 to the CPU 1 or the channel 3, on the same bus.

After the data has been loaded into the channel's CDR Register 50, the VAT 2 raises the MEM DONE line to the channel 3 indicating that the VAT 2 and memory 5 have completed. The channel 3 then loads the data from the CDR Register 50 into the CDRB Register 51, shown in FIG. 2.

At the same time as the data is loaded into the CDRB register 51, the channel 3 activates the TA tag line and gates the data from byte 0 of the CDR Register 50 onto the bi-directional I/O DATA bus 55, bits 0-7, parity P0 (FIG. 2). As noted above, the data in byte 0 of the CDR Register 50 is the device address of the I/O adapter 4 to which the CPU 1 wishes to communicate. When the TA tag signal becomes active on the channel interface, all the I/O adapters 4 compare their device addresses with the device address on the I/O DATA bus. If a compare occurs, the I/O adapter 4 on which the compare occurred activates the VALID B (or VALID H) line to the channel 3, signalling that the I/O adapter 4 has accepted the device address and recognized that there is a command directed to it.

Following this first acceptance signal, the I/O adapter 4 has two different options for handling the command. The I/O adapter 4 can fetch the command at a later time, or the I/O adapter 4 can take the command immediately from the channel 3. If the I/O adapter 4 chooses to fetch the command at a later time, the I/O adapter 4 activates the EOC line, as a termination signal, along with the VALID B (or VALID H, depending on whether the adapter is a byte adapter or a half-word adapter) line. This indicates to the channel 3 that no more data transfers are to take place. The channel 3 then deactivates the TA tag line and removes the device address from the I/O DATA bus 55. The channel 3 raises the I/O VAT REQUEST line and the INVALIDATE PAGE line to the VAT 2. The channel 3 then designates the Start Device Register on the I/O REG SELECT bus 57 to the VAT 2. When the VAT 2 detects the I/O VAT REQUEST line, the VAT 2 fetches the contents of the Start Device Register from the VAT I/O Registers 6 into the VAT Register 401. Because the INVALIDATE PAGE line is raised and the MEM ACCESS line is not raised, the VAT 2 resets the Valid Page bit to invalid (off) in the VAT Register 401 and stores the contents (the command address and the reset Valid Page bit) back into the Start Device Register via the bus 90. This is done so that the CPU 1 can determine when the Start Device Sequence is completed. The CPU 1 determines this by reading out the Start Device Register and testing to see if the Valid Page bit is on. If the Valid Page bit is still on, the channel 3 has not completed the operation. If the Valid Page bit is off, the channel 3 has completed the operation. The I/O adapter 4, for its part, has stored in its Q LT latch (FIG. 1) an indication that an I/O command was delayed and is now pending. After the VAT 2 has stored the Start Device Register back into the VAT I/O Registers 6, the VAT 2 activates the MEM DONE line to the channel 3 indicating the operation is complete. When the channel 3 detects that this line is active, the channel 3 enters the Channel Poll Sequence, which as described below, is used to poll the I/O adapters 4 to determine if they have any requests for use of the channel 3.

Figure 6:
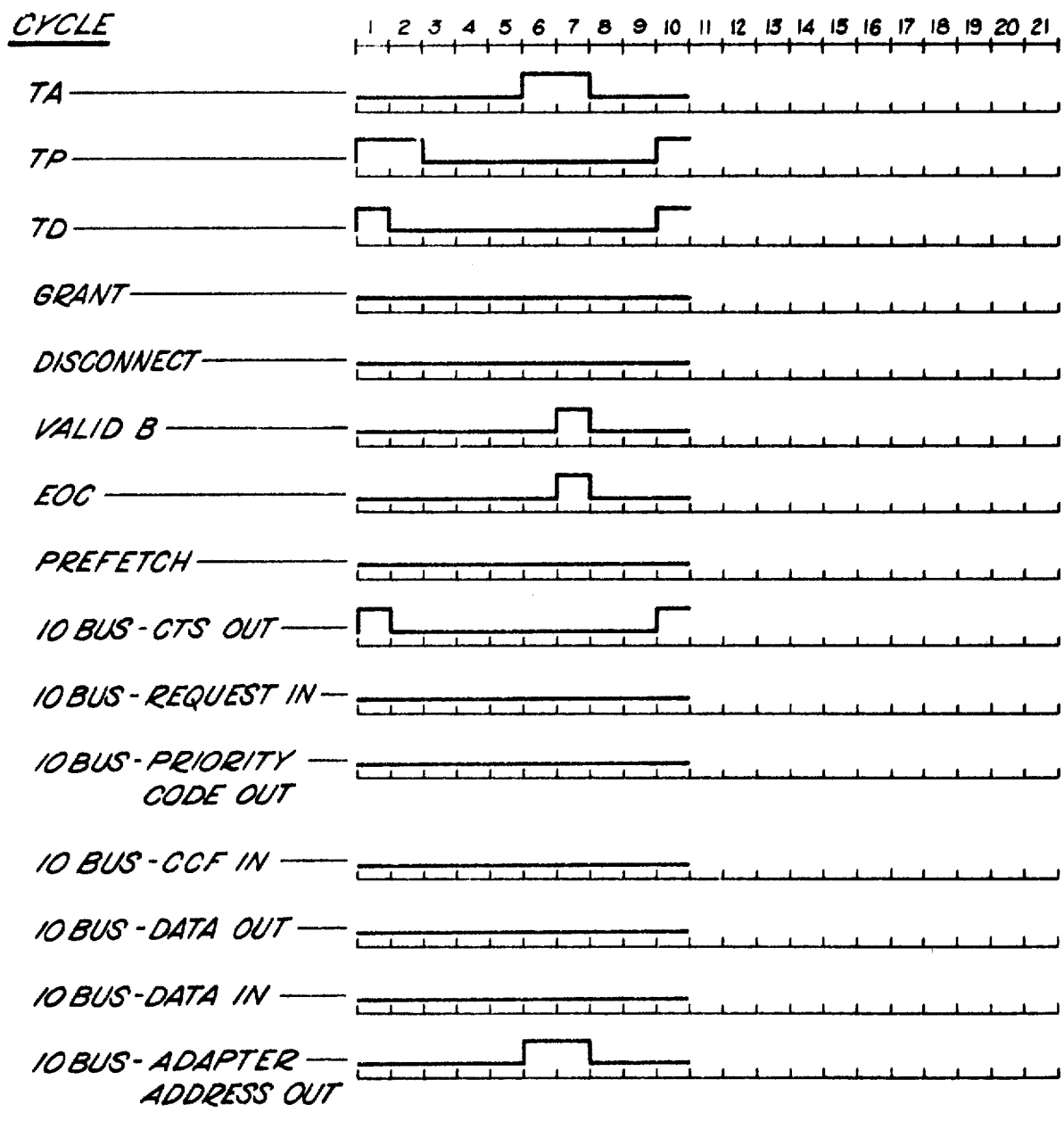
FIG. 6 is a timing diagram showing the timing of activation of various channel interface lines during a Channel Poll Sequence followed by a Start Channel Sequence in which the I/O adapter delays acceptance of a command.

FIG. 6 shows a timing diagram for the channel interface lines for the delayed command acceptance option of the Start Channel Sequence. In time cycles 1 and 2 the channel 3 determines if any I/O adapter is requesting use of the channel. (See Channel Poll Sequence below) The EO Register is loaded prior to cycle 2. Assuming no I/O requests from the I/O adapters 4, the channel 3, aided by the VAT 2, fetches the I/O command from memory 5, using the Start Device Register, during cycles 3, 4, and 5. The I/O command is loaded into the CDR Register 50 during cycle 5. The channel control 60 gates the data from the CDR Register 50 into the CDRB Register 51, places the device address (CDR Register 51, byte 0) on the I/O DATA bus 55 and activates the TA tag line to the I/O adapter 4 in cycle 6. An I/O adapter 4, upon recognizing its device address, activates the VALID B (or VALID H) line (device address acceptance signal) and the EOC line (termination signal) to the channel 3 in cycle 7. In cycle 8, the channel 3 detects the VALID B (or VALID H) and EOC lines, deactivates the TA tag line and removes the device address from the I/O DATA bus 55. The I/O adapter 4 then deactivates the VALID B (or VALID H) and EOC lines. In cycles 8 and 9 the channel 3 also resets the Valid Page bit to invalid in the Start Device Register 1. After the Valid Page bit is reset, the channel 3 returns to the Channel Poll Sequence (see below) in cycle 10.

If the I/O adapter 4 wishes to fetch the command immediately from the channel 3, the I/O adapter 4 recognizing its device address on the I/O DATA bus 55 activates the VALID B (or VALID H) line (as a device address acceptance signal) and the PREFETCH line, but does not activate the EOC line. When the channel 3 detects the VALID B (or VALID H) line active without the EOC line active, the channel 3 activates the TD and GRANT lines, deactivates the TA tag line and gates the first byte of the CDRB Register 51 onto the I/O DATA bus 55. Because the PREFETCH line is active, indicating that more than four bytes of data are to be transferred to the I/O adapter 4, the channel 3 activates its memory addressing means, the I/O VAT REQUEST, MEM ACCESS, INCREMENT and MEM FETCH lines to the VAT 3. The channel 3 then designates the Start Device Register to the VAT 2 on the I/O REG SELECT bus 57. The VAT 2 selects the Start Device Register, loads its contents (an updated address) into the VAT Register 401, updates it by incrementing the contents by four and stores the incremented value back into the Start Device Register. The VAT 2 then gates the (unincremented) address from the VAT Register 401 to the memory 5 along with the MEMORY FETCH line. The memory 5 fetches the data (the second four bytes of the command) addressed by the Start Device Register and stores the data (the command) in the CDR Register 50 by means of the MEMORY DATA bus 7 and SAMPLE MEM DATA line. The VAT 2 then activates the MEM DONE line to the channel 3 to indicate that the VAT 2 and memory cycle are complete. While the channel 3 is fetching the second four bytes of data into the CDR Register 50, it gates the first four bytes of data, which are already in the CDRB register 51, onto the I/O DATA bus 55. The I/O adapter 4 deactivates the PREFETCH line after receiving the first byte of data from the channel 3 to indicate that no more additional four-byte blocks will be prefetched from memory 5. After the channel 3 has transferred the first four bytes of data to the I/O adapter 4 from the CDRB register 51, the channel 3 gates the second four bytes of data from the CDR Register 50 to the CDRB Register 51 and from there to the I/O adapter 4. When the I/O adapter 4 receives the eighth byte of data (last byte of the command), the I/O adapter 4 activates the EOC line to indicate that no more data is to be transferred. Upon detecting the EOC line becoming active, the channel 3 deactivates the TD and GRANT lines. The I/O adapter 4 then deactivates the VALID B (or VALID H) and EOC lines. After the channel has finished transferring the command, the channel 3 activates the I/O VAT REQUEST and INVALIDATE PAGE lines to the VAT 2 and designates the Start Device Register on the I/O REG SELECT bus to the VAT 2. The VAT 2 selects the Start Device Register by loading it into the VAT Register 401, sets the Valid Page bit off (invalid) and stores the result back into the Start Device Register. The VAT 2 next activates the MEM DONE line to the channel 3, indicating that the VAT cycle is complete. The channel 3 then returns to the Channel Poll Sequence (see below).

Figure 7:
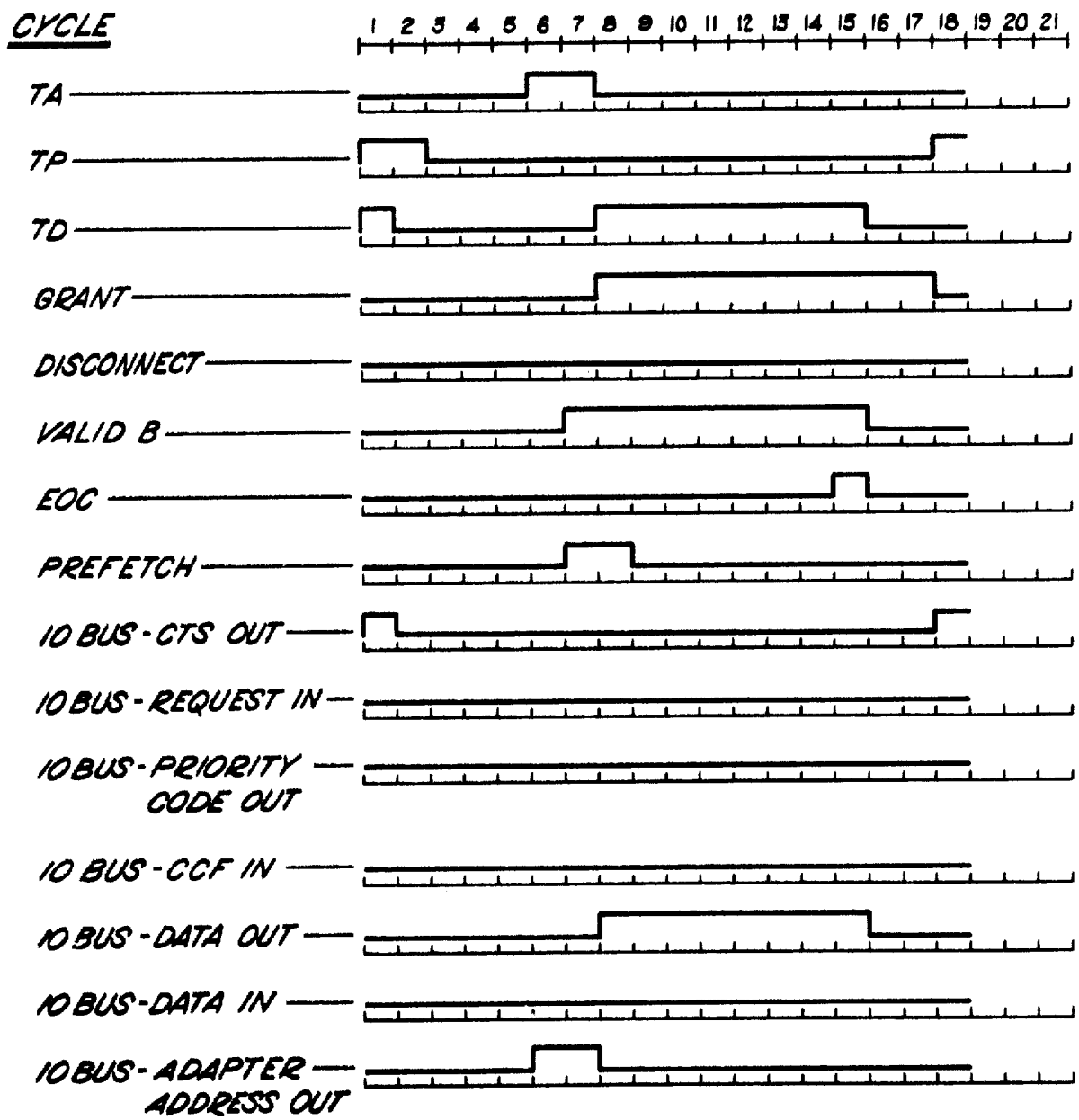
FIG. 7 is a timing diagram showing the timing of activation of various channel interface lines during a Channel Poll Sequence in which the I/O adapter accepts a command immediately.

FIG. 7 is a timing diagram of the immediate command acceptance option of the Start Channel Sequence. During cycles 1 and 2, the channel 3 polls the I/O adapters 4 to determine if any I/O adapter 4 requires use of the channel interface (See Channel Poll Sequence below). The EO Register is loaded by the CPU 1 prior to cycle 2. Assuming no I/O adapter 4 requests use of the channel 3, the channel 3 fetches the I/O command from memory 5, using the Start Device Register, in cycles 3, 4, and 5. In cycle 5, the first four bytes of the I/O command are stored into the CDR Register 50 and then into the CDRB Register 51. In cycle 6, the channel 3 activates the TA tag line and gates the device address from the CDRB Register 51 onto the I/O DATA bus. The I/O adapter 4 that recognizes its device address on the I/O DATA bus 55 raises the VALID B (or VALID H) line (device address acceptance) and the PREFETCH line (but not the EOC line) during cycle 7. In response to detecting the VALID B (or VALID H) line being active, in cycle 8 the channel 3 deactivates the TA tag line, activates the TD and GRANT lines, and gates the first byte of data (the command) onto the I/O DATA bus 55. In this cycle the channel 3 also requests the next memory fetch into the CDR Register 50 since the PREFETCH line is active. In cycles 9, 10 and 11, the channel 3 transfers the second, third and fourth bytes of data (the command) over the I/O DATA bus 55. In cycle 9 and I/O adapter 4 deactivates the PREFETCH line to indicate that no more four-byte blocks of data will be fetched. Because the second group of four bytes of channel data was stored in the CDR Register 50 in cycle 10, the channel 3 now transfers this data to the CDRB Register 51 in cycle 12 and gates the fifth byte of the command over the I/O DATA bus 55. The channel 3 gates the sixth, seventh, and eighth bytes of the command onto the I/O DATA bus 55 in cycles 13, 14 and 15. In cycle 15, the I/O adapter 4 activates the EOC line to indicate that no more data is to be transferred. The channel 3 deactivates the TD line in cycle 16 in response to the EOC line being active. The I/O adapter 4 deactivates the EOC and VALID B (or VALID H) lines in cycle 16, after receiving the eighth byte of the command. In cycles 16 and 17 the channel 3 causes the Valid Page bit in the Start Device Register to be set off. The channel 3 then returns to the Channel Poll Sequence in cycle 18.

Channel Poll Sequence—The Channel Poll Sequence is performed by the channel 3 to poll the I/O adapters 4 to determine if any I/O adapter 4 is requesting use of the channel interface. A priority mechanism controls the order of polling and the selection of the I/O adapter 4 which is granted use of the channel interface. As best understood from FIG. 2, the channel 3 polls the I/O adapters 4 by activating the TP and TD lines and placing the contents of the Slice Counter Register 53 on the first four bits of the I/O DATA bus 55. The Slice Counter Register 53 is a four-bit counter that starts with a value of 0 and counts upward. Each I/O adapter is identified, and given a priority, in part, by a time slice value assigned to it. All I/O adapters 4 requiring use of the channel 3 when TP and TD become active compare the first four bits on the I/O DATA bus 55 with the four-bit time slice assigned to them. If there is no compare, the I/O adapters 4 do nothing. The channel 3 deactivates the TD line and loads the data from the I/O DATA bus 55 into the first two bytes of the CDR Register 50. The channel 3 then gates the data from the first two bytes of the CDR Register 50 through the Priority Encode circuitry 52 which detects if any bit in these two bytes is active. Assuming no I/O adapter requested use of the channel 3, then no bits in these two bytes will be active. Accordingly, the Slice Counter Register 53 is incremented by 1, unless the Poll Limit Register 70 equals the contents of the Slice Counter Register 53, in which case the Slice Counter Register 53 is restarted with a value of 0.

The channel 3 next activates the TD line again and gates the new contents of the Slice Counter Register 53 over the first four bits of the I/O DATA bus 55. All I/O adapters 4 requiring use of the channel interface again compare the first four bits on the I/O DATA bus 55 with their assigned four-bit time slice. The channel 3 deactivates the TD line and removes the time slice value from the I/O DATA bus 55. Any I/O adapters 4 whose time slices compared activate one of the 16 I/O DATA bus 55 lines. Each line identifies the priority of an I/O adapter 4. An I/O adapter 4 with a priority of 0 will raise I/O DATA bus 55 line 0; an I/O adapter 4 with a priority of 15 will raise I/O DATA bus 55 line 15. Thus, up to 16 I/O adapters may request use of the channel 3 per time slice by activating an I/O DATA bus bit. The channel 3 loads the priority data from the I/O DATA bus 55 into the first two bytes of the CDR Register 50. The channel 3 then gates the first two bytes from the CDR Register 50 to the Priority Encode 52. As shown in greater detail in FIG. 13, the Priority Encode 52 determines which I/O adapter 4 on this time slice has the highest priority and is to be granted use of the channel 3. For example, if all of the bits are on, priority 0 would be loaded into the Priority Register 54, because I/O DATA bus bit 0 is the highest priority. If bits 3, 5 and 7 are on, a priority of 3 would be loaded in the Priority Register 54. If any priority bit is found to be on in the CDR Register 50, the channel 3 proceeds to the Channel Grant Sequence (described below) for the I/O adapter 4 with the highest priority among the bits. Note that the time slice of the I/O adapter 4 requesting use of the channel 3 remains in the Slice Counter Register 53 after the priority of the highest priority I/O adapter 4 is loaded into the Priority Register 54. These two four-bit registers (Slice Counter and Priority) together uniquely define the channel priority of an I/O adapter 4. Thus, a maximum of 256 different channel priorities are possible (16 time slices with 16 priorities per time slice), with the present priority mechanism.

FIG. 6 cycles 1 and 2 illustrates the timing of the Channel Poll Sequence as performed by the priority mechanism. In cycle 1, the channel 3 activates the TP and TD lines and gates the contents of the Slice Counter Register 53 on the I/O DATA bus 55, bits 0-3. In cycle 2, the channel 3 examines the I/O DATA bus 55 to determine if any I/O adapter 4 requested use of the channel 3 by activating the I/O DATA bus 55 line corresponding to its priority. If no I/O DATA bus 55 line is active, the channel 3 returns to cycle 1 and gates the next time slice value onto the I/O DATA bus 55. The timing of the channel's activities continuing beyond the Channel Poll Sequence when the channel 3 finds an I/O DATA bus 55 line active appears in connection with the description of the Channel Grant Sequence, next below.

Channel Grant Sequence—The Channel Grant Sequence is performed by the channel 3 to connect the channel interface to a particular I/O adapter 4 and then transfer data to or from the I/O adapter 4.

The channel 3 grants use of the channel interface to the particular I/O adapter 4 which has been identified by the Priority Encode 52 as having the highest priority. The grant begins by activating the GRANT and TP lines, gating the contents of the Slice Counter Register 53 on the first four bits of the I/O DATA bus 55 and gating the contents of the Priority Register 54 onto the second four bits of the I/O DATA bus 55.

All I/O adapters 4 which requested use of the channel 3 when their time slice compared during the initial poll sequence perform a compare on all eight bits on the I/O DATA bus 55 to determine if the channel 3 was granted to them. If the channel priority of a particular I/O adapter 4 does not compare, it has not been granted the channel 3 and will again request use of the channel 3 when the activated TP and TD lines and the time slice assigned to the I/O adapter 4 are seen by the I/O adapter 4. If the channel priority does compare, the I/O adapter 4 registering the compare will further participate in the Channel Grant Sequence as follows.

The channel 3 deactivates the TP line and activates the TD and GRANT lines to indicate to the granted I/O adapter 4 that the I/O adapter 4 should transfer the channel control field (CCF) to the channel 3. The CCF is a 2-byte field that the I/O adapter 4 transfers to the channel 3 over the I/O DATA bus 55 to inform the channel 3 of the function to be performed, i.e. a memory fetch, a memory store or an interrupt function. FIG. 4 shows the bit meaning of bytes 0 and 1 of the CCF. As seen from byte 0, the I/O adapter 4 has two basic options. It may do a memory request (bit 0=1) or an interrupt function event (bit 0=0). The interrupt functions available to the I/O adapter 4 are (1) Command End-/Fetch Next Command (everything worked correctly); (2) Command End (some type of error or exception occurred); (3) Allocate Page (place 0's in a page for future use by an I/O adapter); and (4) Resolve Next Page (bring the next page referenced by the virtual address in an I/O register into memory). The handling of interrupt functions is explained below in the discussion of the I/O Interrupt Sequence. Byte 1 of the CCF specifies the particular register in the VAT I/O Registers 6 to be used when a memory fetch or memory store is called for. If an interrupt function is to be performed, the I/O adapter 4 specifies the code for an I/O command register in byte 1 of the CCF. For purposes of further discussion of the Channel Grant Sequence and, in particular, its role in permitting an I/O adapter 4 to delay acceptance of a command, a memory transfer CCF, involving the memory fetch of eight bytes of data which constitute a delayed command, will be described.

The I/O adapter 4 which was granted use of the channel 3 activates the VALID B (or VALID H) line to the channel 3 and places the first byte of the CCF on the I/O DATA bus 55. Because, by assumption, the I/O adapter 4 has used the delayed command acceptance option during the Start Device Sequence, i.e. the I/O adapter 4 did not take the command immediately and merely stored an indication of command pending, the I/O adapter 4 will send out a value of hexadecimal '80' as byte 0 of the CCF, specifying a memory fetch and incrementing the specified I/O register. The adapter 4 also activates the PREFETCH line (along with the VALID B line) to indicate that more than four bytes of data will be fetched from memory 5. The channel 3 places byte 0 of the CCF into byte 0 of the CDR Register 50. The I/O adapter 4 then specifies the code for the I/O command register for this adapter in byte 1 of the CCF, by placing this on the I/O DATA bus 55, and activates the EOC line to indicate that this is the last byte of the CCF. The channel 3 loads the I/O command register identifier into byte 1 of the CDR Register 50, and, because the EOC line is active, loads the first two bytes of the CDR Register 50 into the CCR Register 56. The control hardware of the channel 3 then uses the information in the CCR Register 56 to determine the function to be performed. Because by assumption, the function to be performed is a memory fetch, the channel 3 deactivates the TD line to signal the I/O adapter 4 that the data is not yet ready. The channel 3 then activates the I/O VAT REQUEST, INCREMENT, MEM FETCH and MEM ACCESS lines to the VAT 2. Following activation of these lines, the channel 3 specifies the particular I/O command register from byte 1 of the CCR Register 56 on the I/O REG SELECT bus 57 to the VAT 2. The VAT 2 selects the specified I/O command register and stores the contents of that register into the VAT Register 401. The VAT 2 then gates the address from the VAT Register 401 to the memory 5 and activates the MEMORY FETCH line to the memory 5. Following this operation, the VAT control 402 increments the specified I/O command register (in the VAT Register 401) value by four and stores the result back in the I/O command register. The memory control (not shown) fetches the data (the first four bytes of a command) from memory 5 and places the data in the CDR Register 50 via the MEMORY DATA bus 7.

In response to the MEM DONE line becoming active from the VAT 2, the channel 3 loads the data from the CDR Register 50 to the CDRB Register 51, activates the TD line and gates the first byte of data from the CDRB Register 51 onto the I/O DATA bus 55.

Because the PREFETCH line is active upon completion of the first memory fetch, the channel 3 starts a second memory fetch by activating the I/O VAT REQUEST, INCREMENT, MEM ACCESS and MEM FETCH lines and designating the same I/O command register as before to the VAT 2 on the I/O REG SELECT bus 57. The VAT 2 selects the specified I/O command register, loads the contents onto the VAT Register 401, increments the contents of the specified I/O command register by four and stores this back into the I/O command register. The VAT 2 then gates the (unincremented) address in the VAT Register 401 to the memory along with the MEMORY FETCH line. The memory control fetches four bytes of data (the second four bytes of the command) from memory 5 and gates this data over the MEMORY DATA bus 7 into the CDR Register 50. The VAT 2 then activates the MEM DONE line to the channel 3 to indicate that the VAT and memory cycles are complete.

While the channel 3 is prefetching the next four bytes of data from memory 5, the channel 3 also gates the first four bytes of data to the I/O adapter 4 over the I/O DATA bus 55. The I/O adapter 4 deactivates the PREFETCH line upon receiving the first byte of data, to indicate no additional memory fetches will be required. The channel next gates the second four bytes of the command to the I/O adapter 4.

Upon receiving the eighth byte of the command, the I/O adapter 4 activates the EOC line to indicate no additional data is to be transferred. The channel 3, upon detecting the EOC line becoming active, deactivates the TD and GRANT lines and returns to the Channel Poll Sequence. The I/O adapter 4 deactivates the VALID B (or VALID H) and EOC lines.

In the assumed case the Channel Grant Sequence used a CCF for a memory fetch of a delayed command. However, the Channel Grant Sequence is essentially the same for a memory fetch of data which is not a command. The channel hardware makes no distinction between fetching a command or fetching data. The only difference is in the VAT I/O register designated by the I/O adapter 4 which, in the case of a delayed command, is an I/O command register. In the case of a normal data fetch (or store) an I/O data register would be specified. In either case, the I/O adapter 4 controls the number of bytes transferred during the Channel Grant Sequence and specifies whether a fetch or store is to be performed. Accordingly, an I/O adapter 4 which has stored an indication that a command is pending has means for specifying a memory fetch using an address in its I/O command register to cause the channel 3 to fetch from memory 5 the delayed command which the adapter now wishes to execute.

Figure 8:
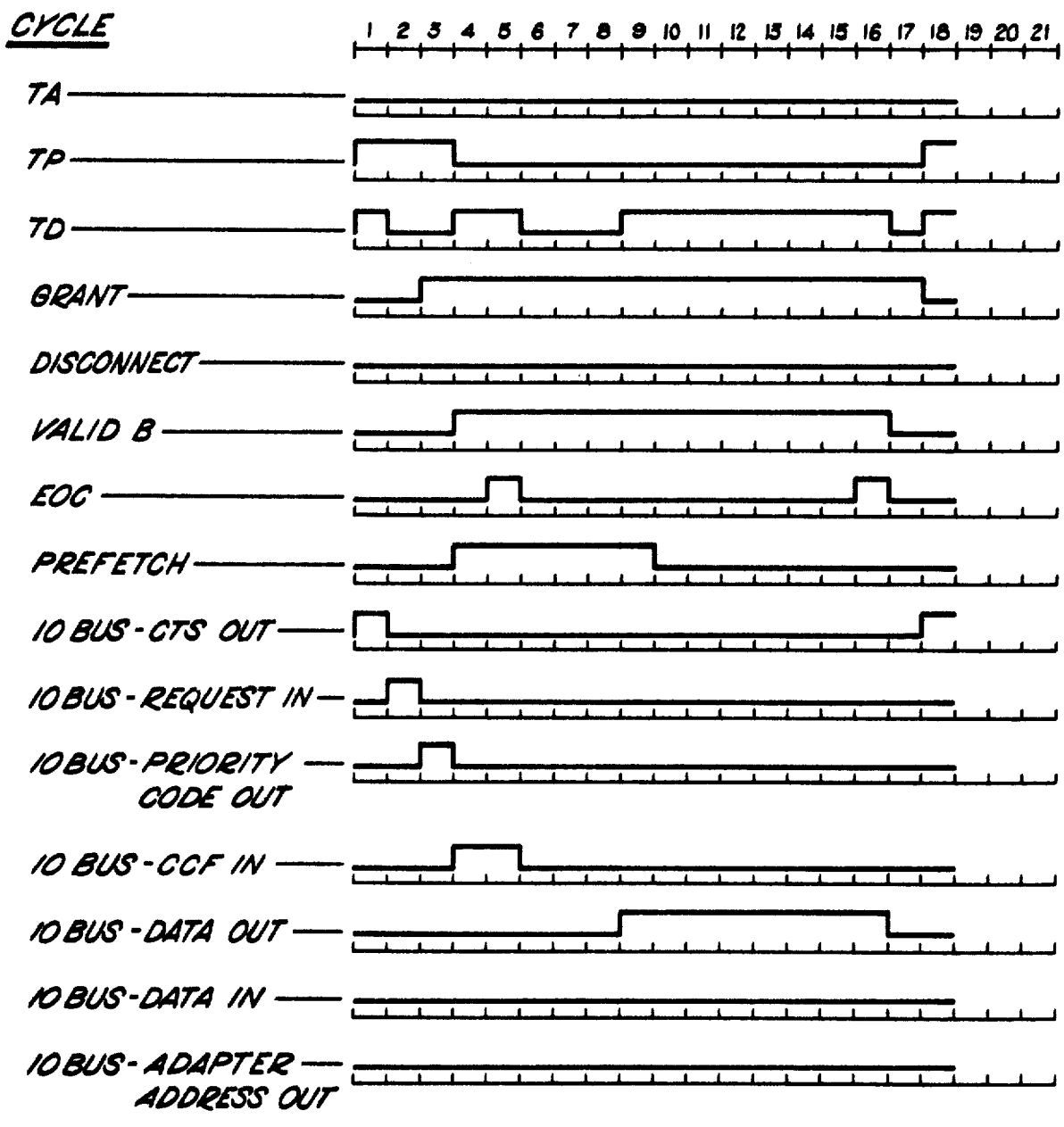
FIG. 8 is a timing diagram showing the timing of activation of various channel interface lines during a Channel Grant Sequence in which the I/O adapter fetches an eight-byte delayed command from memory.
Figure 8:
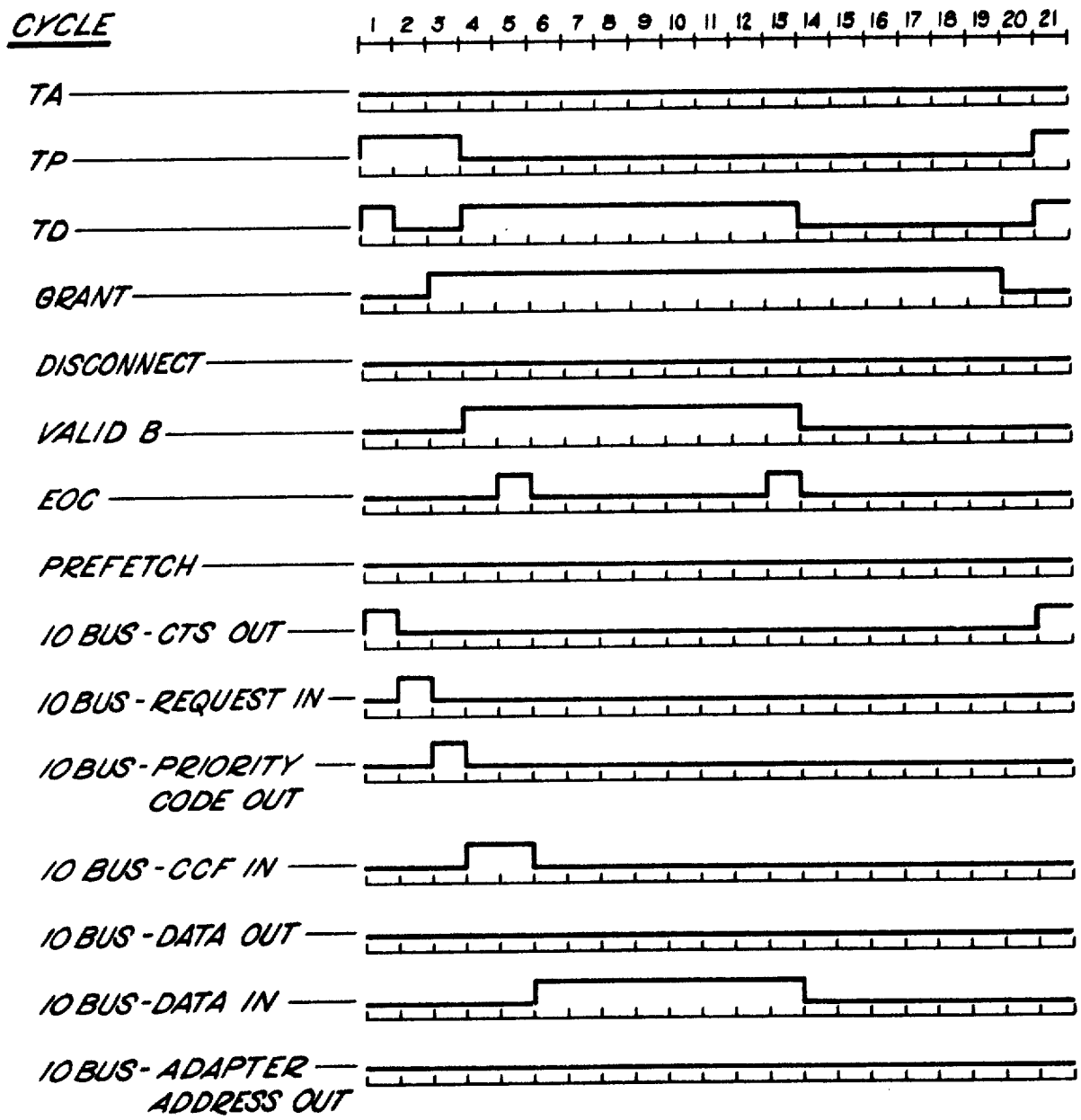

FIG. 8 is a timing diagram of the previously-described fetch from memory of an eight byte delayed I/O command. During cycle 1 the channel 3 polls the I/O adapters 4 with a four-bit time slice value on the I/O DATA bus 55. In cycle 2, the I/O adapters 4 which recognize their time slice request use of the channel 3 by setting one or more of the I/O DATA bus 55 bits on. In cycle 3 the channel 3 grants use of the channel interface to the requesting I/O adapter 4 with the highest priority, by activating the TP and GRANT lines and placing the full time slice priority code of the highest priority I/O adapter 4 on the I/O DATA bus 55. In cycle 4 the channel 3 deactivates the TP line and activates the TD and GRANT lines to indicate to the granted I/O adapter 4 that the channel 3 is ready to receive the CCF. In cycle 4 the I/O adapter 4 activates the VALID B (or VALID H) and PREFETCH lines and gates byte 0 of the CCF onto the I/O DATA bus 55. In cycle 5 the I/O adapter 4 designates its associated I/O command register in byte 1 of the CCF on the I/O DATA bus 55 and activates the EOC line to indicate that this is the end of the CCF.

Because, in this example, the CCF specifies a memory fetch, the channel 3 in cycle 6 deactivates the TD line to indicate to the I/O adapter 4 that the channel 3 has not yet fetched the data from memory 5. The channel 3 then fetches the data (in this example, the first four bytes of a command) from memory 5 in cycles 6, 7 and 8 using the I/O command register that the I/O adapter 4 designated in byte 1 of the CCF. The data from memory 5 is loaded into the CDR register 50 in cycle 8, byte 0 is sent on I/O DATA bus 55 in cycle 9. Because the PREFETCH line is active in cycle 9, the channel 3 fetches the next four bytes of the command from memory 5 in cycles 9, 10 and 11. The channel 3 transfers the second, third and fourth bytes of the command to the I/O adapter 4 during cycles 10, 11 and 12. In cycle 10, the I/O adapter 4 deactivates the PREFETCH line, after receiving the first byte of the command. In cycle 11, the second four bytes of the command from memory 5 are stored in the CDR Register 50. In cycle 13, the CDR Register 50 is loaded into the CDRB Register 51 and the fifth byte of data is transferred to the I/O adapter 4. The channel 3 then transfers the sixth, seventh, and eighth bytes of the command to the I/O adapter 4 in cycles 14, 15 and 16. In cycle 16, the I/O adapter 4 activates the EOC line to indicate that no more data is to be transferred. In cycle 17 the channel 3 deactivates the TD line, and in cycle 19 it goes back to the Channel Poll Sequence.

I/O Interrupt Sequence—When an I/O adapter 4 has completed processing a command from the CPU 1, the I/O adapter 4 requests use of the channel 3 in the same manner as in the Channel Poll Sequence described above. The purpose of the request is to permit the I/O adapter 4 to report the outcome of its processing of the command. The channel 3 grants use of the channel interface to an I/O adapter 4 by raising the GRANT and TP lines and placing the channel priority of the I/O adapter 4 having the highest priority onto the I/O DATA bus 55. The I/O adapter 4 then compares the channel priority on the I/O DATA bus 55 with its assigned priority. An adapter 4 which finds a match with its assigned priority is granted the channel 3.

After placing the channel priority on the I/O DATA bus 55, the channel 3 deactivates the TP line and activates the TD and GRANT lines to indicate to the I/O adapter 4 that the channel 3 is ready to receive the CCF. The I/O adapter 4 then activates the VALID B (or VALID H) line and places byte 0 of the CCF on the I/O DATA bus 55. If the command completed successfully, the I/O adapter 4 will place a value of hexadecimal '01' (Function Event—Command End/Fetch Next Command) on the I/O DATA bus 55. If an error was detected, or an exception occurred, the I/O adapter 4 will place a value of hexadecimal '02' (Function Event—Command End) on the I/O DATA bus 55. (See FIG. 4). The channel 3 stores the data from the I/O DATA bus 55 into the first byte of the CDR Register 50. Next, the I/O adapter 4 designates its associated I/O command register by placing its code number on the I/O DATA bus 55. The channel 3 stores this code into the second byte of the CDR Register 50. The I/O adapter 4 then proceeds to place two more bytes of status information on the I/O DATA bus 4. These status bytes only have meaning when a Command End (hexadecimal '02' in byte 0) is sent to the channel 3. The status bytes define the type of error or exception. The channel 3 stores the two status bytes in the third and fourth bytes of the CDR Register 50. The data in the CDR Register 50 is then loaded into the CDRB Register 51. As the I/O adapter 4 transfers the second byte of status information, the EOC line is activated to indicate that the transfer is complete. Upon detecting the EOC line, the channel 3 deactivates the TD line.

Because the function event sent by the I/O adapter 4 signals termination of processing of an I/O command, the channel 3 sets the Valid Page bit off in the specified I/O command register, to prevent the I/O adapter 4 from referencing memory 5 with this I/O register. To do this, the channel 3 activates the I/O VAT REQUEST and INVALIDATE PAGE lines to the VAT 2 and designates the I/O command register specified in the CCF to the VAT 2 on the I/O REG SELECT bus 57. The VAT 2, in response to the I/O VAT REQUEST and INVALIDATE PAGE lines being active, selects the specified I/O command register, resets its Valid Page bit to invalid and stores the modified contents back into the I/O Command register, using the VAT Register 401. The VAT 2 then activates the MEM DONE line to the channel 3 indicating that the VAT cycle is complete.

Because the interrupt function is to be sent on to the CPU 1 which issued the original I/O command, the channel 3 activates the I/O VAT REQUEST, MEM ACCESS and INCREMENT lines to the VAT 2. The channel 3 then designates the Event Stack Register to the VAT 2 on the I/O REG SELECT bus 57. By convention, the Event Stack Register points to the I/O Event Stack (not shown) in memory 5 which handles all communication from the channel 3 to the CPU 1. The channel 3 stores the function event on the I/O Event Stack and increments the contents of the Event Stack Register by four, using the VAT Register 401. At some later time, the CPU 1 will retrieve this event from the I/O Event Stack, decrement the Event Stack Register by four, and process the event as required.

The specific steps in storing the function event on the I/O Event Stack are as follows. The VAT 2 selects the Event Stack Register and loads the address from this register into the VAT Register 401. The VAT 2 gates this address to the memory 5 and activates the GATE MEM DATA line to the channel 3, causing the channel 3 to gate the four bytes of data specifying the function event from the CDRB Register 51 onto the MEMORY DATA bus 7. The memory control then stores the data found on the MEMORY DATA bus 7 into memory 5 at the address specified in the Event Stack Register. The VAT 2 increments the contents of VAT Register 401 by four and stores the result back into the Event Stack Register. The VAT 2 next activates the MEM DONE line to the channel 3, indicating that the VAT and memory cycle is complete. The channel 3 activates the SET EX BIT 8 line to the CPU 1 which causes bit 8 in the EX Register in the CPU 1 (FIG. 1) to be set on. This bit being on indicates to the CPU 1 that the channel 3 has placed data on the I/O Event Stack. The CPU 1 interrogates this bit periodically. When the CPU 1 finds the bit on, it removes and processes all of the events from the I/O Event Stack.

Figure 5:
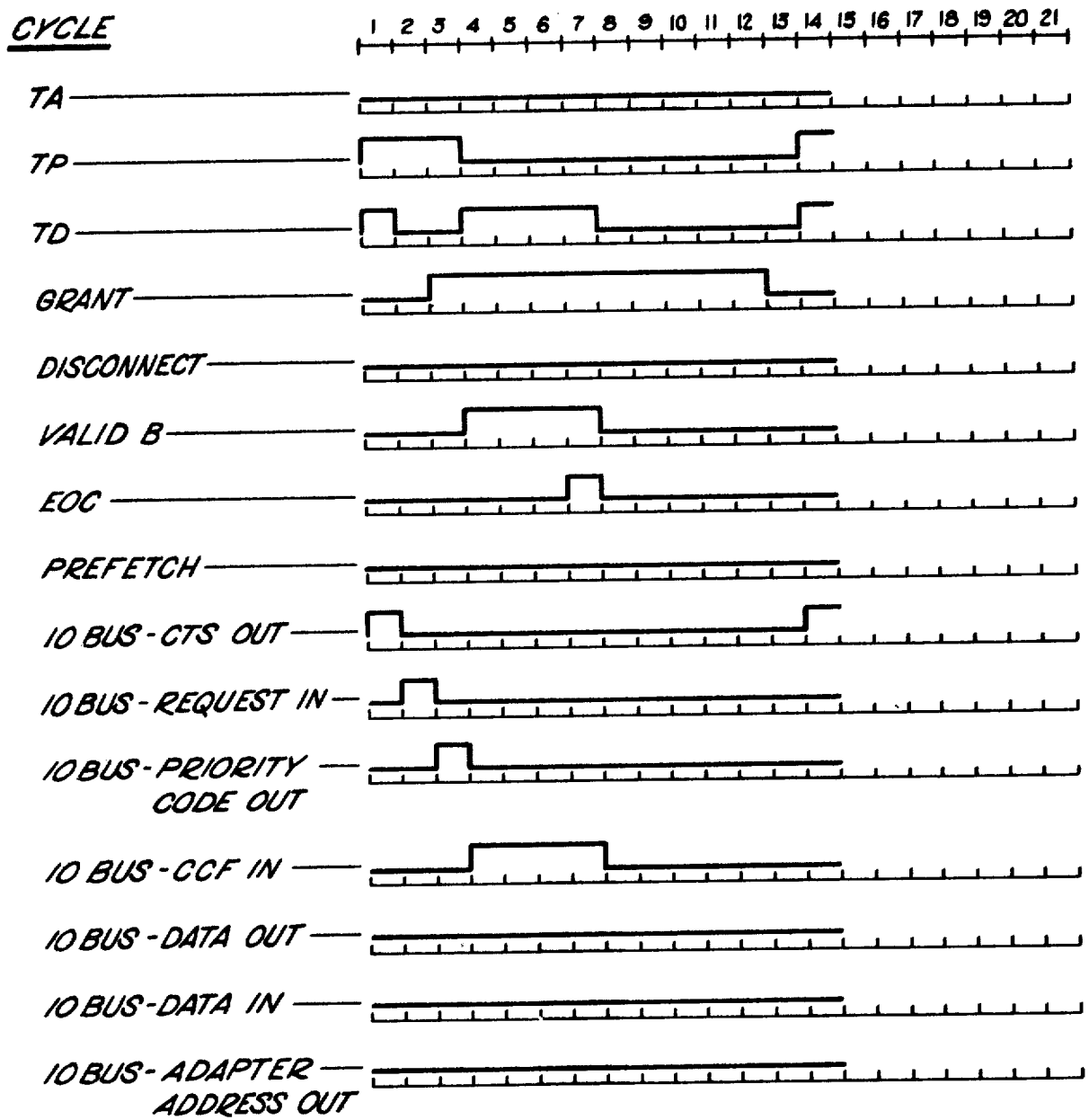
FIG. 5 is a timing diagram showing the timing of activation of various channel interface lines during an I/O Interrupt Sequence.

FIG. 5 is a timing diagram for the channel interface when performing an I/O Interrupt Sequence. In cycles 1, 2 and 3, the channel 3 polls the I/O adapter 4, the I/O adapter 4 requests use of the channel 3 and the channel 3 is granted to the I/O adapter 4. In cycle 4 the I/O adapter 4 gates the channel function code field ('01' for Command End/Fetch Next Command or '02' for Command End) onto the I/O DATA bus 55 and activates the VALID B (or VALID H) line. The channel 3 activates the TD line to indicate that the byte was received. The I/O adapter 4 then transfers a byte specifying its associated I/O command register and two bytes of status information in cycles 5, 6 and 7. In cycle 7, the I/O adapter 4 activates the EOC line to indicate that this is the end of the four-byte function event field. In cycle 8 the channel 3 deactivates the TD line and the I/O adapter 4 deactivates the VALID B (or VALID H) and EOC lines. The channel 3, in turn, resets the Valid Page bit in the specified I/O command register in cycles 8 and 9. In cycle 10 the channel 3 gates the data from the CDR Register 50 to the CDRB Register 51. In cycles 11 and 12, the channel 3 stores the data from the CDRB Register 51 into the I/O Event Stack using the Event Stack Register. In cycle 13, the channel 3 activates the SET EX BIT 8 line to set EX Register bit 8 on in the CPU, indicating that an event was placed on the I/O Event Stack. The channel 3 then returns to the Channel Poll Sequence in cycle 14.

I/O Page Crossing Sequence—When an I/O adapter 4 fetches data from or stores data to memory, the data address used by the I/O adapter 4 is incremented (or decremented) by four (depending on the type of I/O device being serviced) by the VAT control 402. Each I/O adapter 4 can reference data within a page (512 bytes) without complication, but once the I/O data register pointing to the data is incremented or decremented outside of this range, the CPU 1 must load a new address into the I/O register which points to the next piece of data on another main storage page. The addresses used by the I/O adapters 4 are virtual addresses in the sense that the data is referenced as if the data were always located sequentially in memory. Actually, the data is segmented into 512-byte pages, each of which may be in main storage (memory 5) or may be stored in secondary storage at any given time. Thus, the data is not sequential in a physical sense, and to reserve enough pages in memory 5 to make it physically sequential would be a waste of resources. Accordingly, an I/O adapter 4 can be given the ability to use virtual addresses, but the CPU 1 and VAT 2 must carry the responsibility for directing the adapter 4 to the next page of real storage, when the adapter 4 reaches a page boundary.

A page crossing is normally recognized each time an I/O address register (data address or command address) is incremented beyond the 512-byte range of a page. (In certain cases where there will be no memory access using the incremented address, the page crossing need not be recognized and will be ignored.) The page crossing condition must be recognized, because, within a page, I/O addresses can be incremented as if all of virtual memory were physically sequentially in main storage; however, at page boundaries the assumption of physically sequential memory breaks down, and the incremented address is no longer valid. To obtain a new valid address for an I/O adapter 4 which encounters a page crossing, the system must translate the incremented address into a resolved, real memory address. Once this new address is placed in the specified I/O address register, the I/O data transfer interrupted by the page crossing can be resumed. As a means of indicating the valid/invalid status of the addresses in I/O address registers, the VAT control 402 sets and resets the Valid Page bits associated with the registers. The Valid Page bit associated with a particular I/O address register is set off when the associated I/O adapter 4 crosses a page boundary and is set back on when the new, resolved address is loaded in the specified I/O register. As will be described below in the discussion of the I/O Disconnect Sequence, the status of the Valid Page bit is tested by the VAT control 402 at the start of processing of an I/O-originated memory request. If the Valid Page bit is off, the requesting adapter is disconnected or held in a disconnected state, so that other I/O adapters on the same time slice can be serviced. When the Valid Page bit is found on, the disconnect is terminated.

The means for detecting when a page boundary is reached is found in the VAT control circuitry 402, used to increment the contents of the various VAT I/O Registers 6. Because the address in each of these registers is a real address when the Valid Bit is on, each address corresponds to a particular byte in main memory 5. Typically the first byte on a page in main memory 5 is assigned an address number which is evenly divisible by the number of bytes in a page, 512 or $2^9$. Thus, incrementing the address off the end of the page will result in a carry from the ninth bit in the address to the tenth bit. Accordingly, the page crossing can be detected by monitoring the ninth and tenth bits, to see when a carry occurs. A more detailed disclosure of such a mechanism used for detecting a page crossing can be found in the copending, commonly-assigned patent application titled "Address Translation Apparatus", Ser. No. 925,490, filed July 17, 1978, naming as inventors Roy L. Hoffman, et al.

FIG. 9 is the timing diagram for a store into memory in which the boundary of a 512-byte page is crossed. In cycles 1, 2 and 3, the channel 3 polls the I/O adapter 4 to determine if the I/O adapter 4 requires use of the channel interface. The I/O adapter 4 requests use of the channel interface and the channel 3 grants use of the channel interface to the I/O adapter 4. In cycles 4 and 5 the I/O adapter 4 transfers the CCF to the channel 3. Because, by assumption, the I/O adapter 4 is performing a memory store, the I/O adapter 4 sends a hexadecimal 'A0' as byte 0 of the CCF. Byte 1 of the CCF specifies an I/O data register associated with the adapter 4. Both bytes of the CCF are stored in the CCR Register 56. In cycle 5 the I/O adapter 4 activates the EOC line to indicate the end of the CCF. In cycles 6, 7, 8 and 9 the I/O adapter 4 transfers the first four bytes of data to the channel 3 and the channel 3 stores this data in the CDR Register 50. In cycle 10, the channel 3 stores the data in the CDR Register 50 into the CDRB Register 51, activates the I/O VAT REQUEST, MEM ACCESS and INCREMENT lines to the VAT 2 and gates the I/O data register specification from byte 1 of the CCR Register 56 to the VAT 2. The VAT 2 selects the specified I/O data register, loads the contents of that register (an address) into the VAT register 401 and gates the address to the memory 5. The VAT 2 then activates the GATE MEM DATA line to the channel 3, causing the channel 3 to gate the data in the CDRB Register 51 to the MEMORY DATA bus. The memory control stores the data into memory 5 in cycle 11. The VAT 2 next increments the contents of the VAT Register 401 by four and stores the modified value back into the specified I/O data register. The VAT 2 then activates the MEM DONE line to the channel 3.

In cycles 10, 11, 12 and 13 the I/O adapter 4 transfers four more bytes of data to the channel 3. The channel 3 stores these bytes of data in the CDR Register 50. In cycle 13, the I/O adapter 4 activates the EOC line to indicate that no more data will be transferred during this Channel Grant Sequence. If the EOC line were not activated, the I/O adapter 4 could continue to store data. In cycle 14, the channel 3 deactivates the TD line in response to the EOC line becoming active. The I/O adapter 4 deactivates the VALID B (or VALID H) and EOC lines. The channel 3 then loads the data from the CDR Register 50 to the CDRB Register 51, activates the I/O VAT REQUEST, MEM ACCESS and INCREMENT lines to the VAT 2, and specifies its I/O data register to the VAT 2. The VAT 2 selects the specified I/O data register, loads the address in that register into the VAT Register 401, and gates the address to memory 5. The VAT then activates the GATE MEM DATA line to the channel 3, causing the data from the CDRB Register 51 to be gated to the MEMORY DATA bus 7. The memory 5 then stores the data from the MEMORY DATA bus 7 into memory 5 at the address found in the VAT Register 401. The VAT 2 next increments the contents of the VAT Register 401 by four and, because detecting means in the VAT control 402 detect that the incremented address crosses a page boundary (512 bytes), the VAT 2 sets the Valid Page bit in the contents of the VAT Register 401 off. The VAT 2 stores the modified address and Valid Page bit back into the specified I/O data register. The VAT 2 next activates the PAGE CROSSING and MEM DONE lines to the channel 3 in cycle 15. In response to the MEM DONE and PAGE CROSSING lines becoming active, the channel 3 forms an address event, consisting of four bytes, in the CDRB Register 51. This event will be sent to the CPU 1 to inform the CPU 1 that an I/O address register has been incremented outside a page boundary, requiring that a new address be loaded into the I/O register. In cycle 16, the channel 3 gates the contents of the CCR Register 56 (containing the CCF) to the first two bytes of the CDR Register 50. The second two bytes of the CDR Register 50 are loaded with 0's. The contents of the CDR Register 50 are loaded into the CDRB Register 51 in cycle 17.

In cycles 18 and 19, the channel 3 activates the I/O VAT REQUEST, MEM ACCESS and INCREMENT lines, and specifies the Event Stack Register to the VAT 2. The VAT 2 selects the Event Stack Register, loads the address from the Event Stack Register into the VAT Register 401 and gates the address to the memory 5. The VAT 2 then activates the GATE MEM DATA line to the channel 3 causing the four-byte address event in the CDRB Register 51 to be gated to the MEMORY DATA bus 7. The memory control stores the address event on the I/O Event Stack. The VAT 2 increments the contents of the VAT Register 401 by four and stores the result back in the Event Stack Register. The VAT 2 activates the MEM DONE line to the channel 3 to indicate completion of the VAT and memory cycle.

In cycle 20, the channel 3 activates the SET EX BIT 8 line to the CPU 1 to set on bit 8 in the EX Register indicating than an event has been placed on the I/O Event Stack. The channel 3 returns to the Channel Poll Sequence in cycle 21. When the CPU 1 detects that EX Register bit 8 is on, the CPU 1 fetches the event from the I/O Event Stack using the Event Stack Register and decrements the contents of the Event Stack Register by four. The CPU 1 determines that the event is an address event, because bit 0 is on in byte 0 of the Event Stack entry. An interrupt function would have this bit off. Having determined this, the CPU 1 reads the contents of the I/O data register (the address leading to the page crossing) specified in the byte 1 of the address event. This is the incremented address which must be translated into a real memory location. The CPU 1 locates the new real memory location associated with the address in the specified I/O data register and loads this new address into the I/O data register, with the Valid Page bit set on. A means for translating the incremented address by locating the new real storage location is described in the copending, commonly-assigned patent application titled "Address Translation Apparatus," Ser. No. 925,490, filed July 17, 1978, naming as inventors Roy L. Hoffman et al.

Because the data referenced by the address in the specified I/O register may not be in memory yet, the CPU 1 may have to fetch the data from secondary storage or some other source, before the address can be resolved. This will be handled by the operating system's paging supervisor. Once the data is brought into memory 5, then the CPU 1 can load the translated memory address in the specified I/O data register (using the busses 15, 58 and 91, the VAT Register 401 and the CPU REQ line) and set the Valid Page bit on, signaling the completion of translation to the channel 3.

I/O Disconnect Sequence—An I/O Disconnect Sequence occurs when an I/O adapter 4 attempts to transfer data to or from memory and the Valid Page bit is off in the I/O address register specified in the CCF. This sequence causes the channel 3 to inform the I/O adapter 4 that the virtual address has not yet been resolved; therefore, the I/O adapter 4 must retry transferring the data at a later time. This sequence also takes steps to prevent an I/O adapter 4 from tieing up the channel 3 until the virtual address has been resolved by providing a corresponding main storage address. Those objectives are accomplished by disconnection means in the channel 3, particularly Priority Encode 52, which cause the priority of the I/O adapter 4 which encounters the Valid Page bit off to be ignored, thereby permitting servicing of I/O adapters of lower priority on the same time slice.

Figure 10:
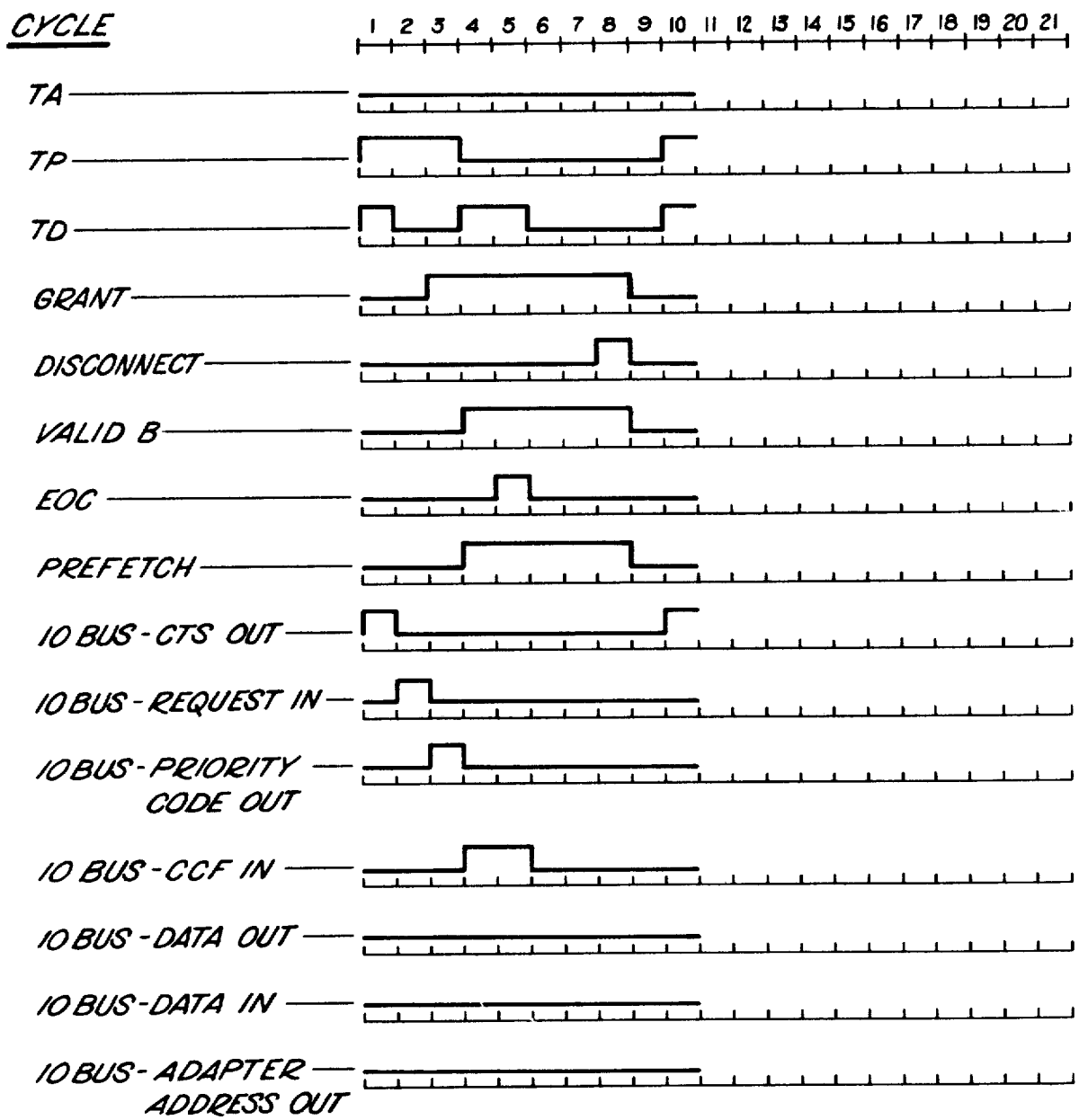
FIG. 10 is a timing diagram showing the timing of activation of various channel interface lines during an I/O Disconnect Sequence occurring during a fetch of data from memory.
Figure 11:
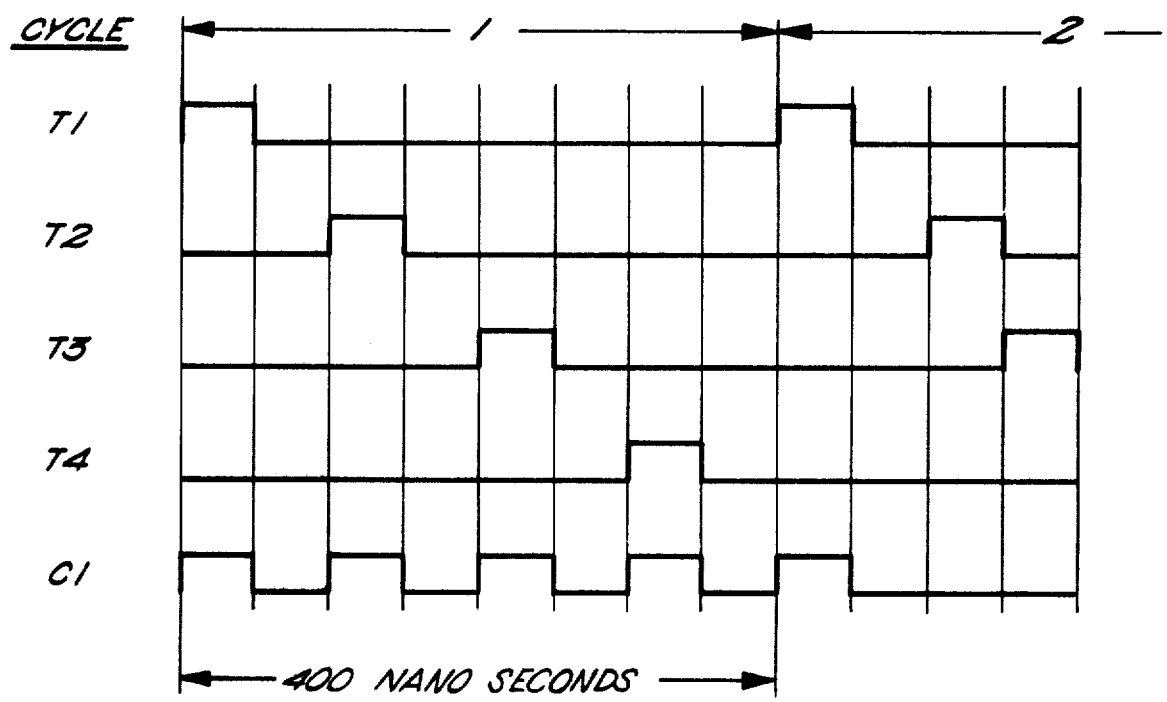
FIG. 11 is a timing diagram showing the relative timing of the five time clocks transmitted from the CPU to the channel C1, T1, T2, T3 and T4.

FIG. 10 is the timing diagram of a I/O Disconnect Sequence using as an example a fetch of data from memory by the I/O adapter 4, attempted after a page crossing has been encountered and the Valid Page bit in the adapter's associated I/O register is turned off, in accordance with the I/O Page Crossing Sequence described above.

In cycles 1, 2 and 3 the channel 3 polls the I/O adapters 4 for any requests. An I/O adapter 4 requests use of the channel 3 and is granted use of the channel interface.

In cycles 4 and 5 the I/O adapter 4 transfers a CCF to the channel 3. Because the I/O adapter 4 has specified a memory fetch in the CCF, the channel 3 deactivates the TD line in cycle 6 indicating that the channel 3 has not yet fetched the data from memory 5. The channel 3 then activates the I/O VAT REQUEST, MEM ACCESS, MEM FETCH, and INCREMENT lines to the VAT 2 and specifies the I/O data register from byte 1 of the CCR Register 56, which holds byte 1 of the CCF.

The VAT 2 selects the specified I/O data register and loads the contents of the I/O data register into the VAT Register 401. However, when the VAT 2 fetches the contents of the I/O data register, the Valid Page bit is tested by the VAT control 402 and is found to be off. This causes the VAT 2 to terminate the memory request by activating the MEM DONE and INVALID PAGE lines to the channel 3 in cycle 7. When the channel 3 detects the MEM DONE and INVALID PAGE lines, the channel 3 activates the DISCONNECT line to the I/O adapter 4 in cycle 8. The I/O adapter 4, upon detecting the DISCONNECT line becoming active, deactivates the VALID B (or VALID H) line and terminates the Channel Grant Sequence in cycle 9. The channel 3 returns to the Channel Poll Sequence in cycle 10.

The channel does not, however, return to polling time slice 0 or the next succeeding time slice. Instead, it polls the same time slice that caused the DISCONNECT line to become active. If any requests from I/O adapters 4 are found on this time slice (the I/O adapter that was disconnected may again request use of the channel interface), the channel 3 proceeds with the Channel Grant Sequence. In doing so the channel 3, by means of the Priority Encode 52, ignores the priority of the adapter that caused the disconnect in the previous poll sequence. Thus, the disconnection means holds the previously disconnected I/O adapter in its disconnected state, preventing it from locking out lower priority adapters on the same time slice. If there are no requests from I/O adapters 4, the channel 3 increments the Slice Counter Register 53 and continues to poll the rest of the time slices.

I/O Command Queuing—Hardware Description

The hardware logic implementing the present invention is shown in greater detail in FIGS. 12, 13, 14, 15 and 16. In these figures a number of conventional components are represented by symbolic blocks, as follows. Blocks marked with "A" are AND gates. In most cases these gates perform a logical AND of several individual lines onto a single output line. In some instances, however, one input to the AND gate is a bus. In these instances, each of the bits or lines in the bus is ANDed with each individual line which is also an input to the AND gate. Thus, in these instances, the output of the gate is a bus, rather than a single line, and the gate designated by an "A" is actually a set of AND gates.

Blocks marked with "OR" are conventional OR gates, performing a logical OR of several lines with an output on a single line. Gates marked with an "XOR" are exclusive OR gates. In some instances, these have more than two input lines, e.g. an eight bit bus. In these instances, the output appears on a single line and is active when an odd number of input bits are active, and is inactive when an even number of input bits are active.

Blocks marked with "N" are NOT gates or inverters. Blocks marked with "GL" are gated latches. These latches sample the active/inactive status of the input line entering the left edge of the block when the sample line entering the lower edge of the block is active. Between samplings a latch holds on its output line at the right edge of the block, the active/inactive status of the input line at the time it was last sampled.

Blocks marked with "T" and "R" are binary triggers. When the reset input line at the lower edge of the block adjacent the "R", is active, the output line is reset to inactive. The reset trigger will hold the inactive state at its output until it receives an active signal at the trigger input, at the left edge of the block adjacent the "T", at which time the output will become active. The output will remain active until a second active signal appears at the trigger input or until an active signal appears at the reset input, at which time the output becomes inactive again. Unless otherwise indicated, a trigger will change state at the leading edge of a trigger or reset signal. When the trigger changes state of the trailing edge of the signal, special note will be made.

Blocks marked "DECODE" accept a binary coded input on two or more lines and activate a single output line corresponding to the value of the binary coded input. Blocks marked "PAR GEN" accept a number of bits or lines as inputs and produce a single parity bit as output. The parity bit is active when the input contains an even number of active bits and inactive when the input contains an odd number of active bits.

Figure 12:
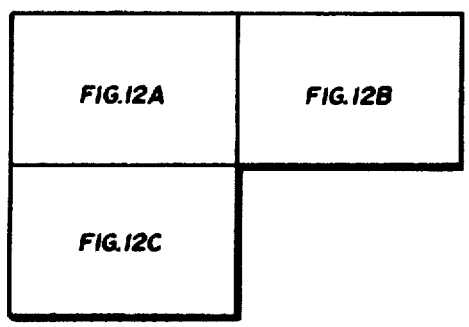
FIG. 12, including

FIG. 12 is a block schematic and flow diagram which shows the central portion of the sequencing logic which controls the progress of the channel 3 through the various sequences discussed above, including the I/O Disconnect Sequence. The logical states which are the constitutents of these sequences are most readily observed in the two four-bit gated latches SEQ LT 100 and SEQ LTB 101, and in the two four-bit Decodes 102 and 103, each of which activates one of the output lines SS0-SS15 and ST0-ST15, respectively. The additional logic elements which are shown in FIG. 12 include AND gates 110-137, 241, OR gates 140-153 and 190-193, NOT gates 160-185, 296, and gated latches 104, 105 and 207.

Figure 13:
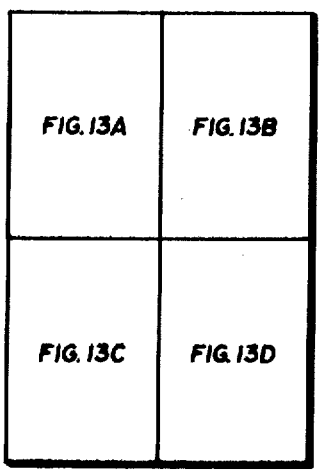
FIG. 13, including

FIG. 13 is a block schematic and flow diagram of the Priority Encode 52 in the channel 3. As seen in FIG. 13, the Priority Encode 52 comprises: a four-bit Decode 800; AND gates 801-816, 840-855, 892 and 895; OR gates 871-889, 891 and 894; NOT gates 817-832, 856-870, 890 and 893; and gated latch 896.

Figure 14:
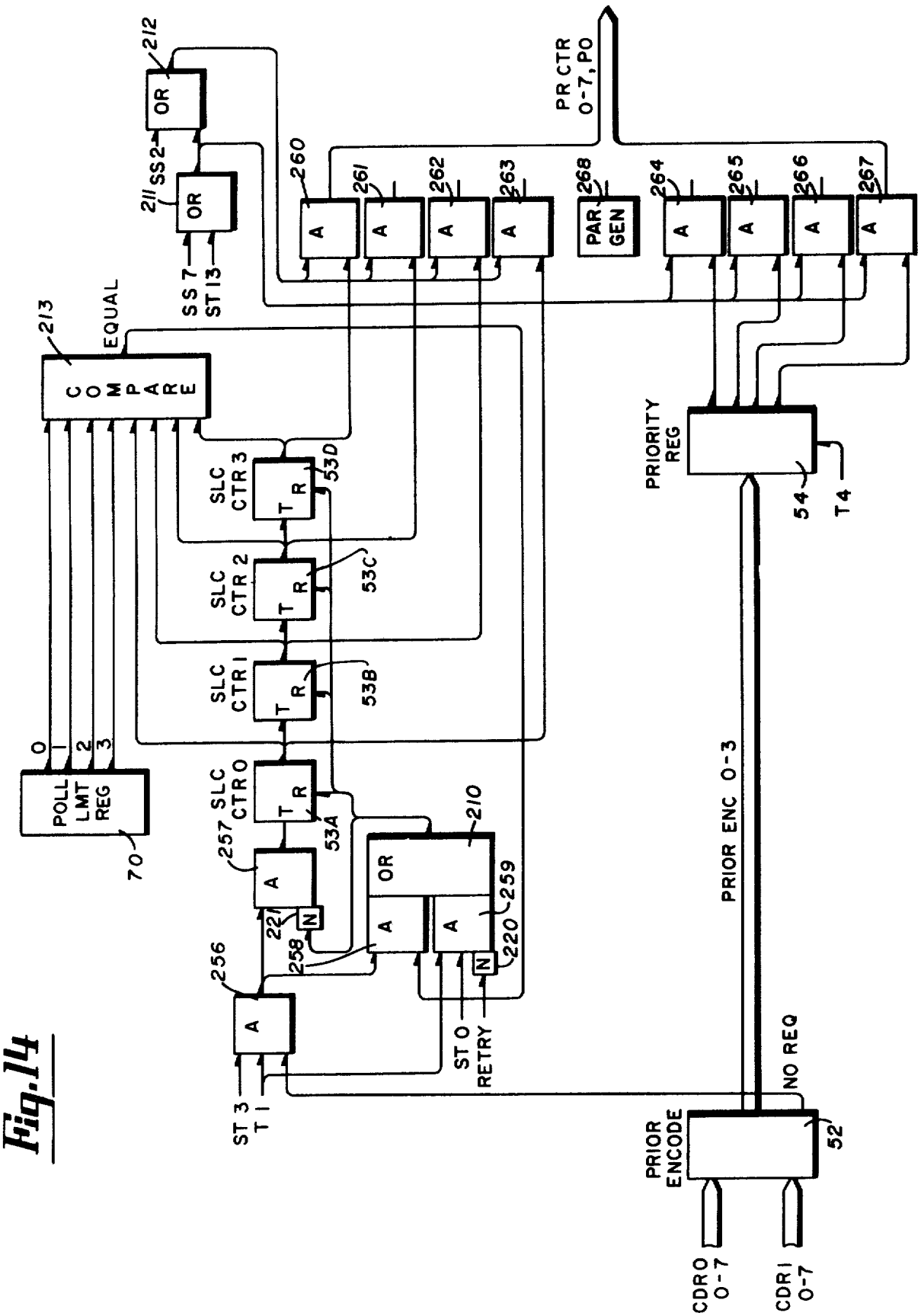
FIG. 14 is a detail block schematic and flow diagram of the polling and priority circuitry in the channel.

FIG. 14 is a block schematic and flow diagram of the polling and priority circuitry in the channel 3. As seen in FIG. 14, this circuitry comprises: the Priority Encode 52 of FIG. 13; the four-bit Poll Limit Register 70; the four-bit Priority Register 54; the four binary triggers 53A-53D, also labeled SLC CTR0 to SLC CTR3, together forming the Slice Counter Register 53; AND gates 256-267; OR gates 210-212; NOT gates 220-221; the four-bit comparator 213; and the parity generator 268.

Figure 15:
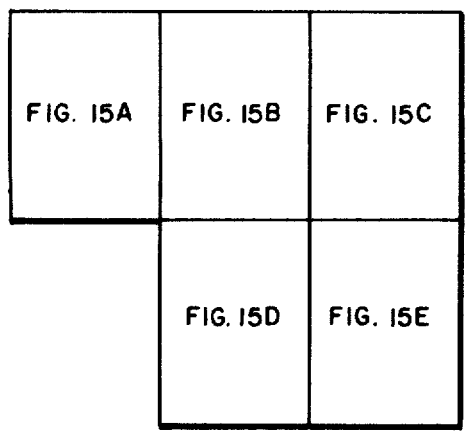
FIG. 15, including
Figure 15A:
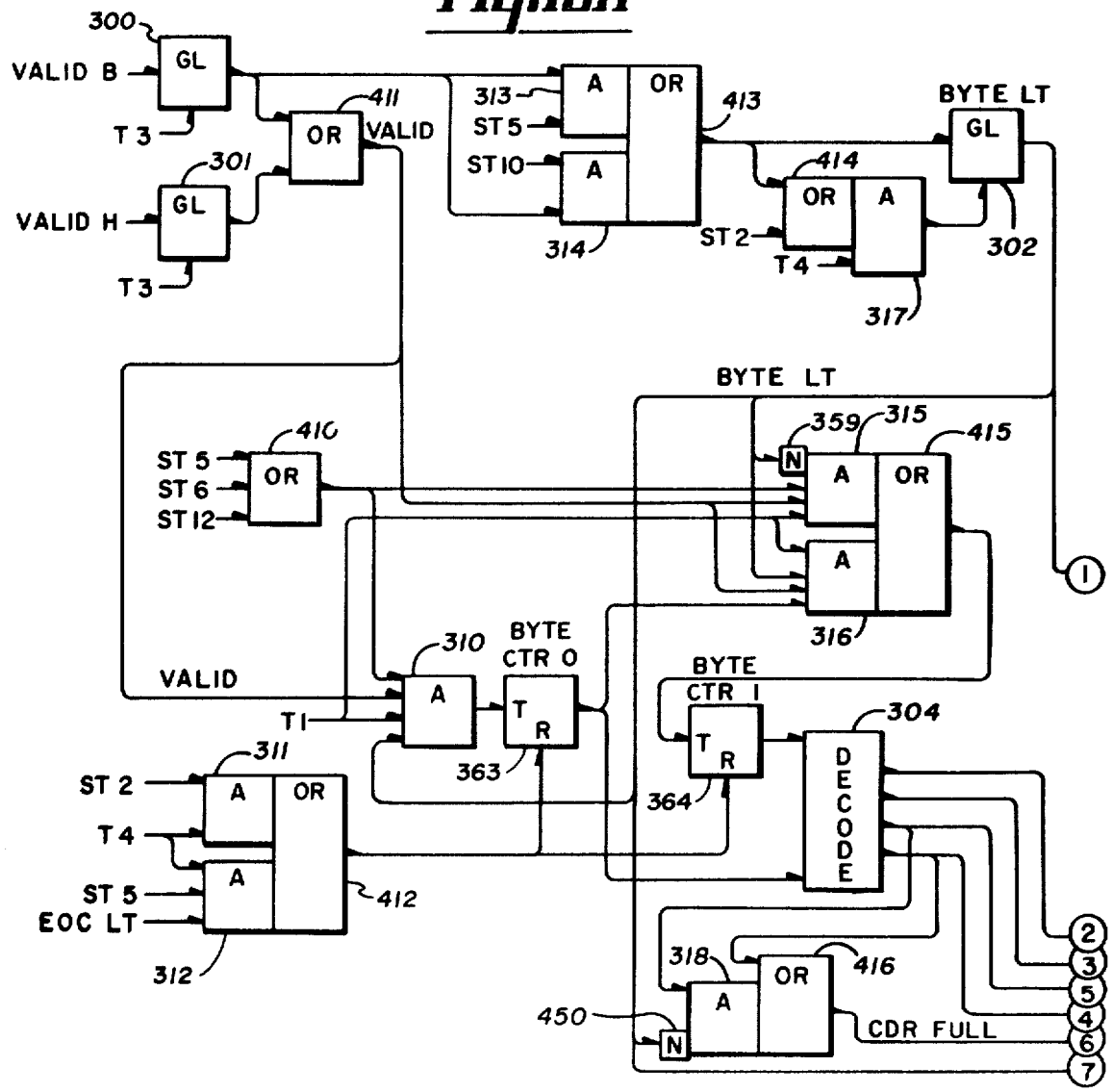
Figure 15B:
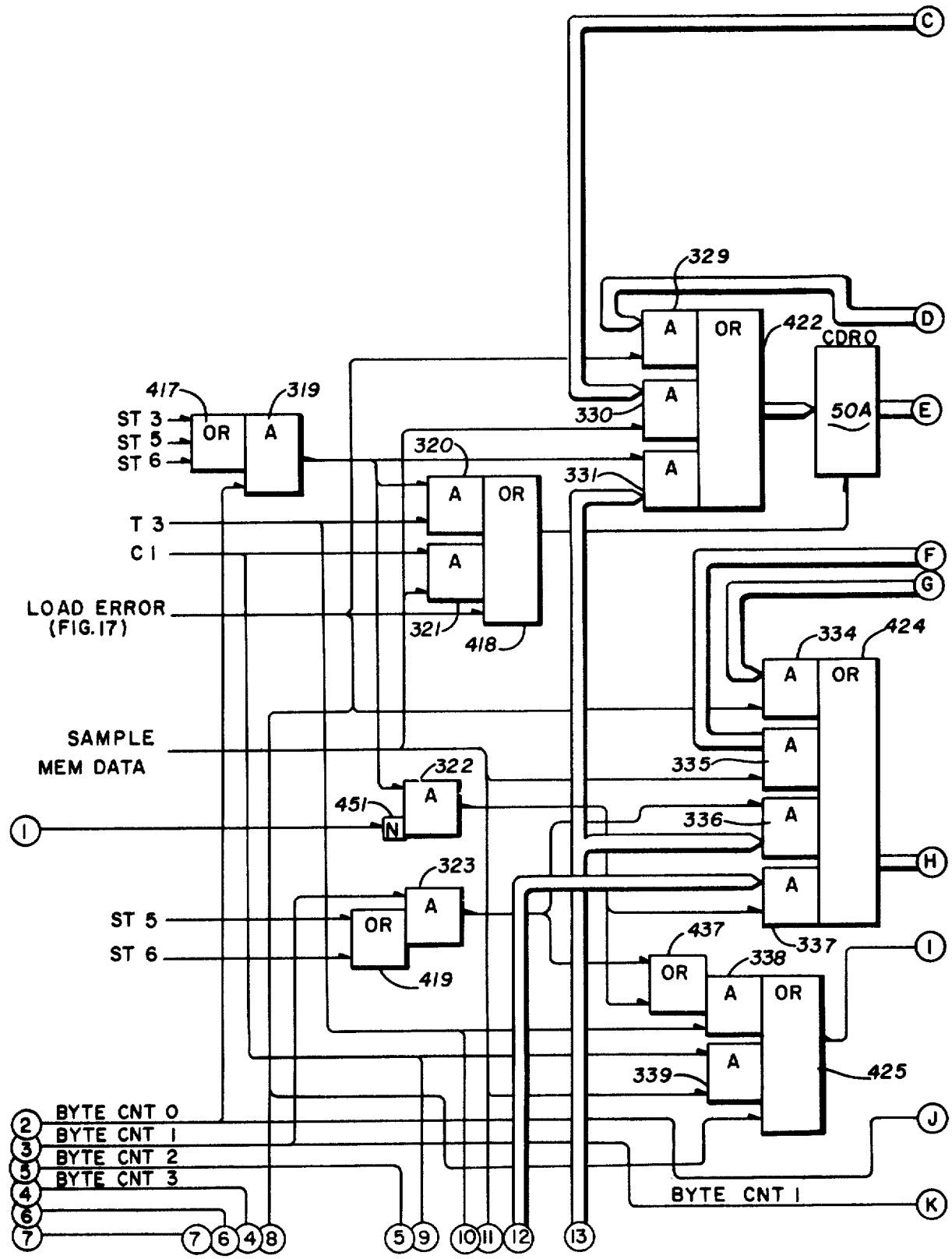
Figure 15C:
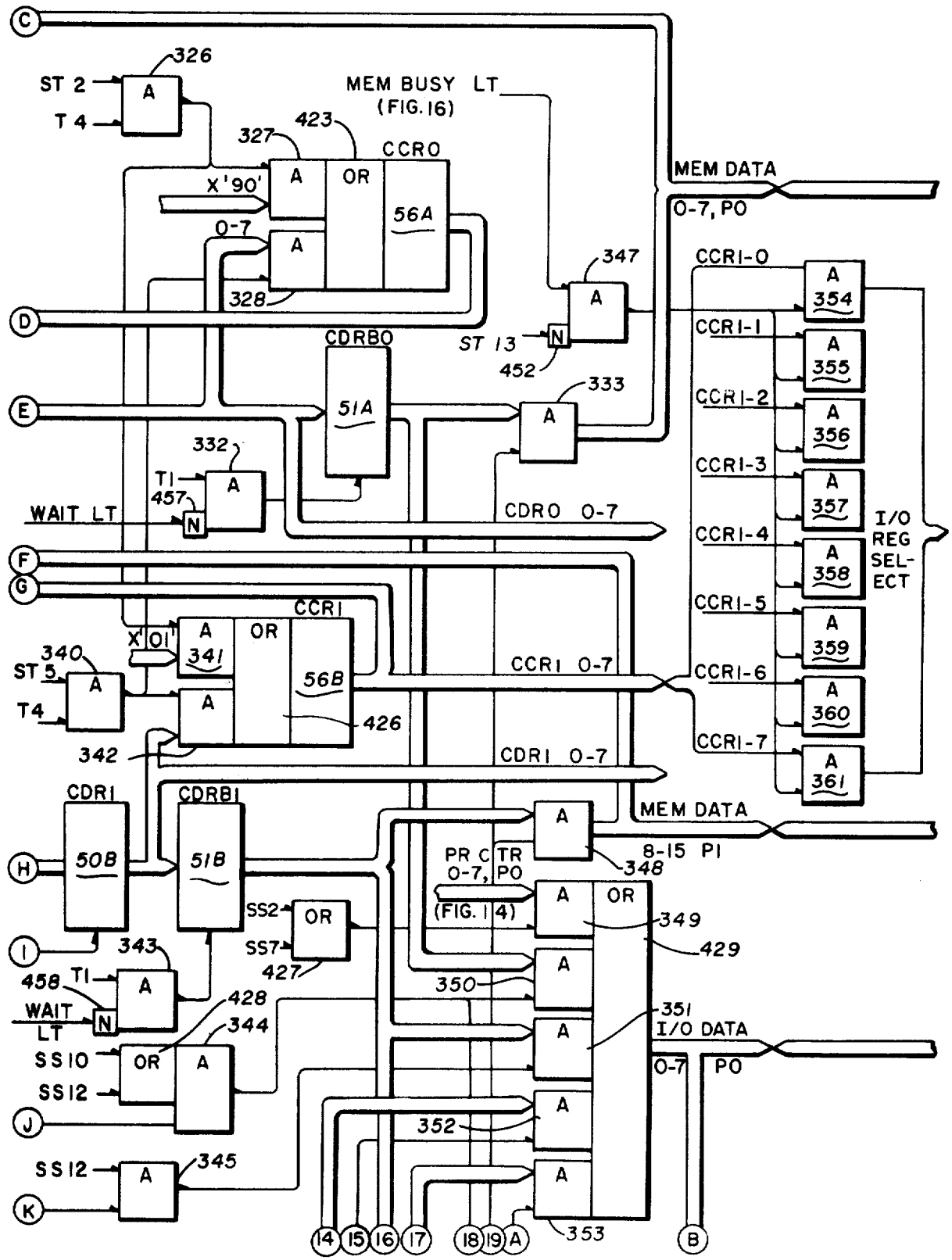
Figure 16A:
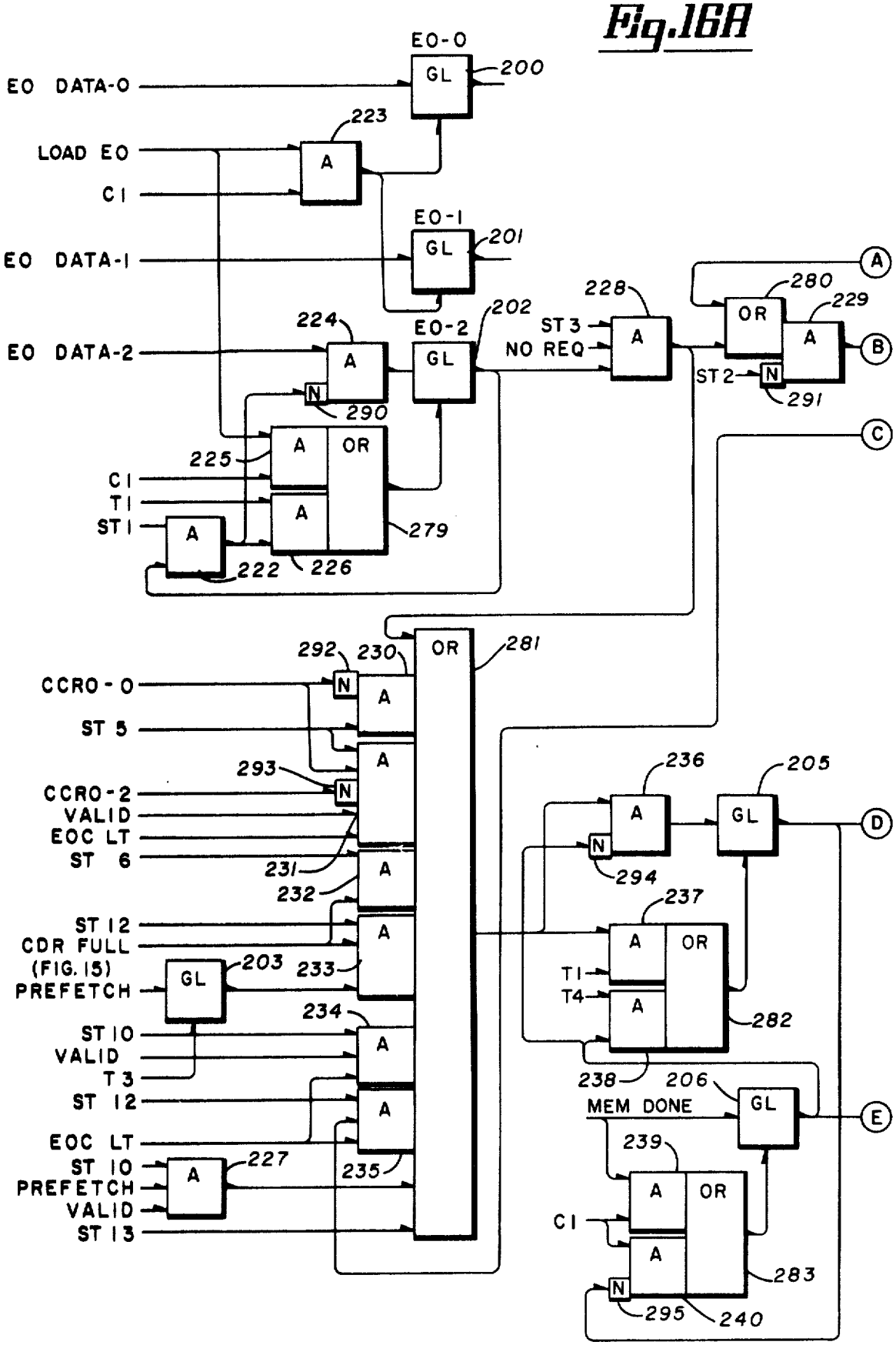
FIGS. 16A-16B, is a detail block schematic and flow diagram of the channel circuitry driving the control lines from the channel to the VAT and the CPU, showing lines and busses connected to the VAT, the I/O adapter, the CPU and the circuitry of FIGS. 12-15.
Figure 16B:
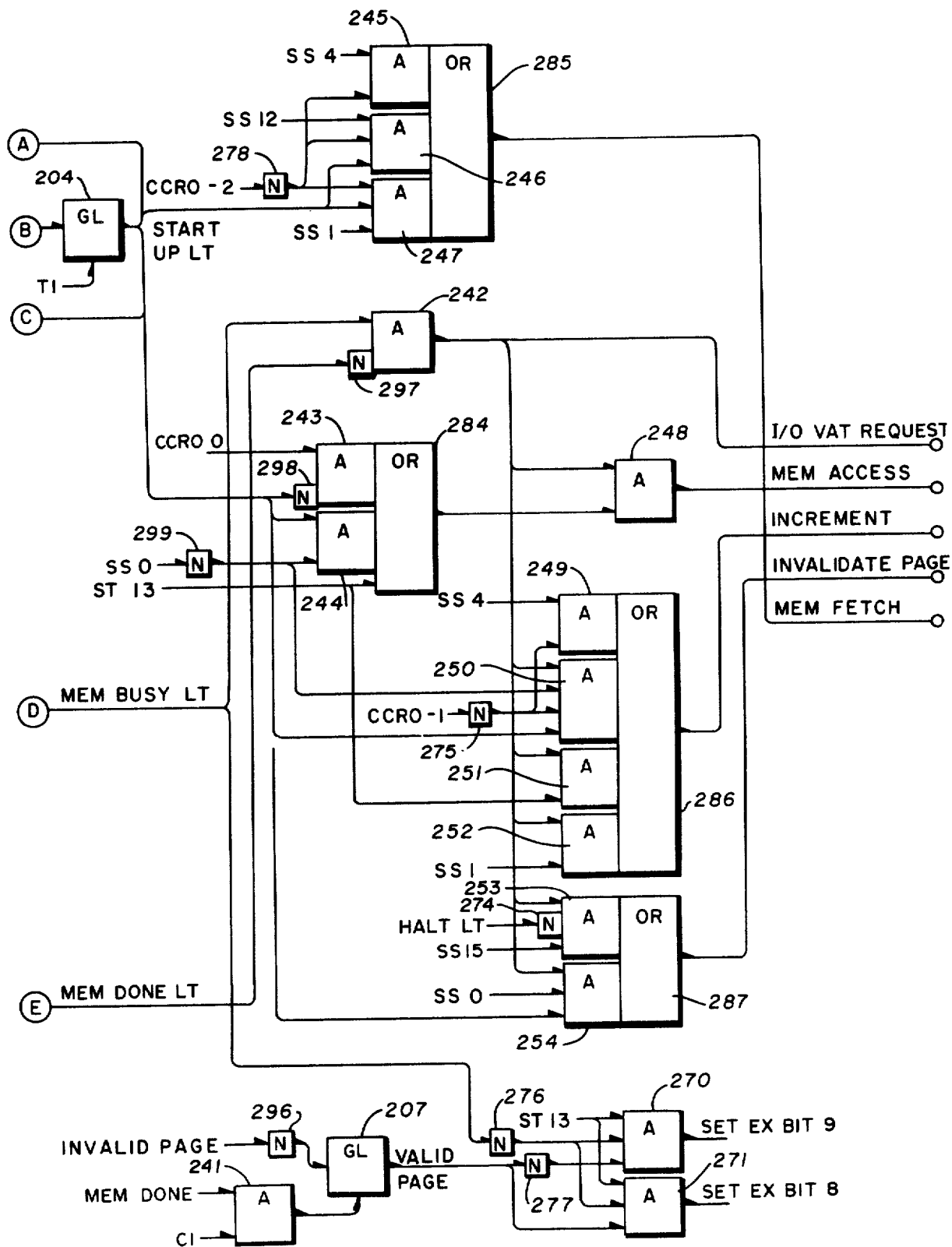

FIG. 15 is a block schematic and flow diagram of the various channel registers and their supporting circuitry. As seen in FIG. 15, this portion of the channel includes: four nine-bit (including parity), gated registers CDR0 to CDR3, 50A-50D, forming the CDR Register 50; four nine-bit (including parity), gated registers CDRB0 to CDRB3, 51A-51D, forming the CDRB Register 51; two eight-bit, gated registers CCR0 and CCR1, 56A, 56B, forming the two-byte CCR Register 56; trailing edge binary triggers 363, 364 labeled BYTE CTR0 and BYTE CTR1; gated latches 300-303; the two-bit Decode 304; AND gates 300-383; OR gates 410-436; and NOT gates 450-455.

Figure 16:
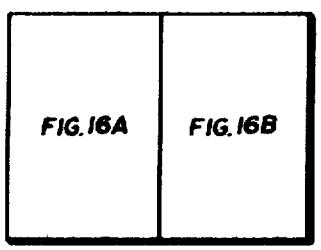
FIG. 16, including
Figure 1B:
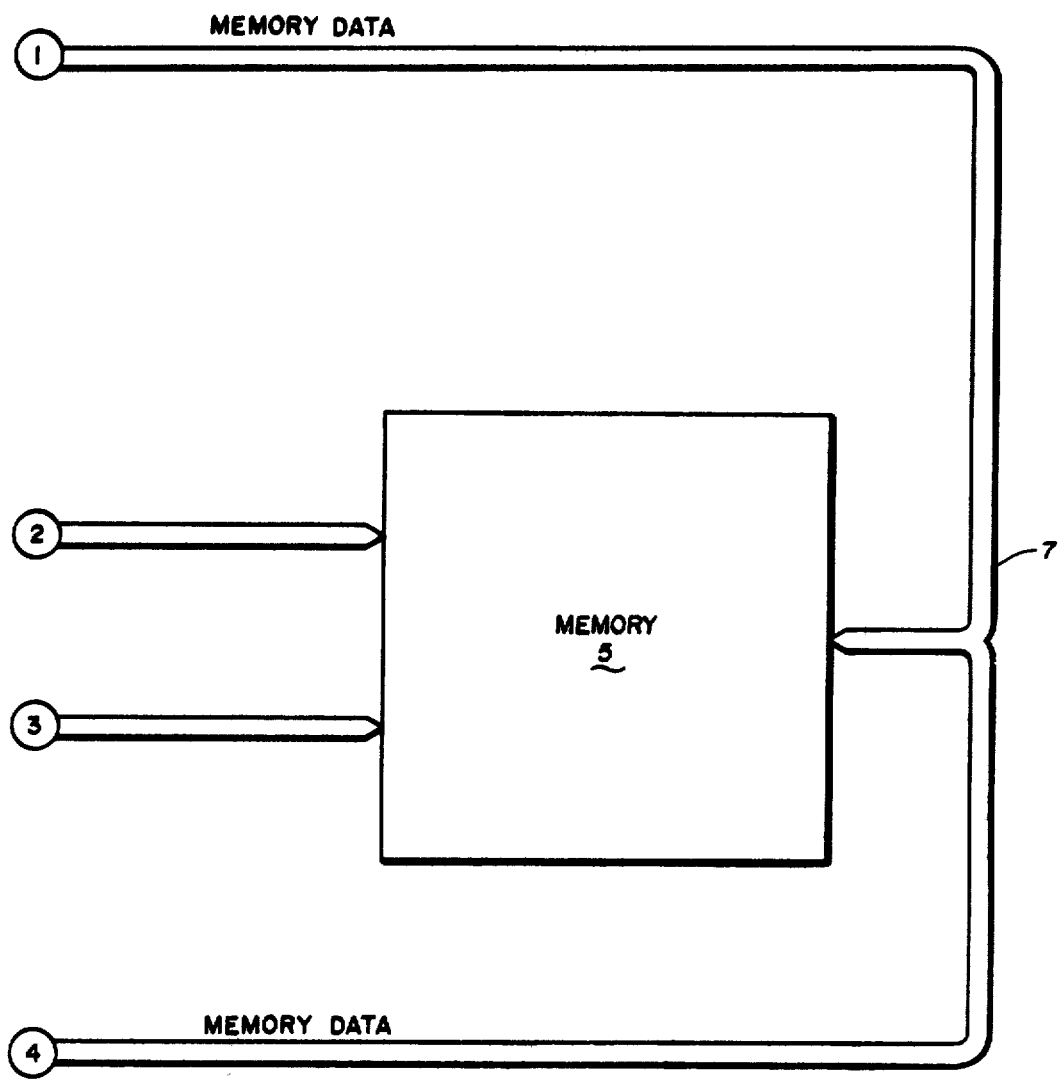
Figure 1C:
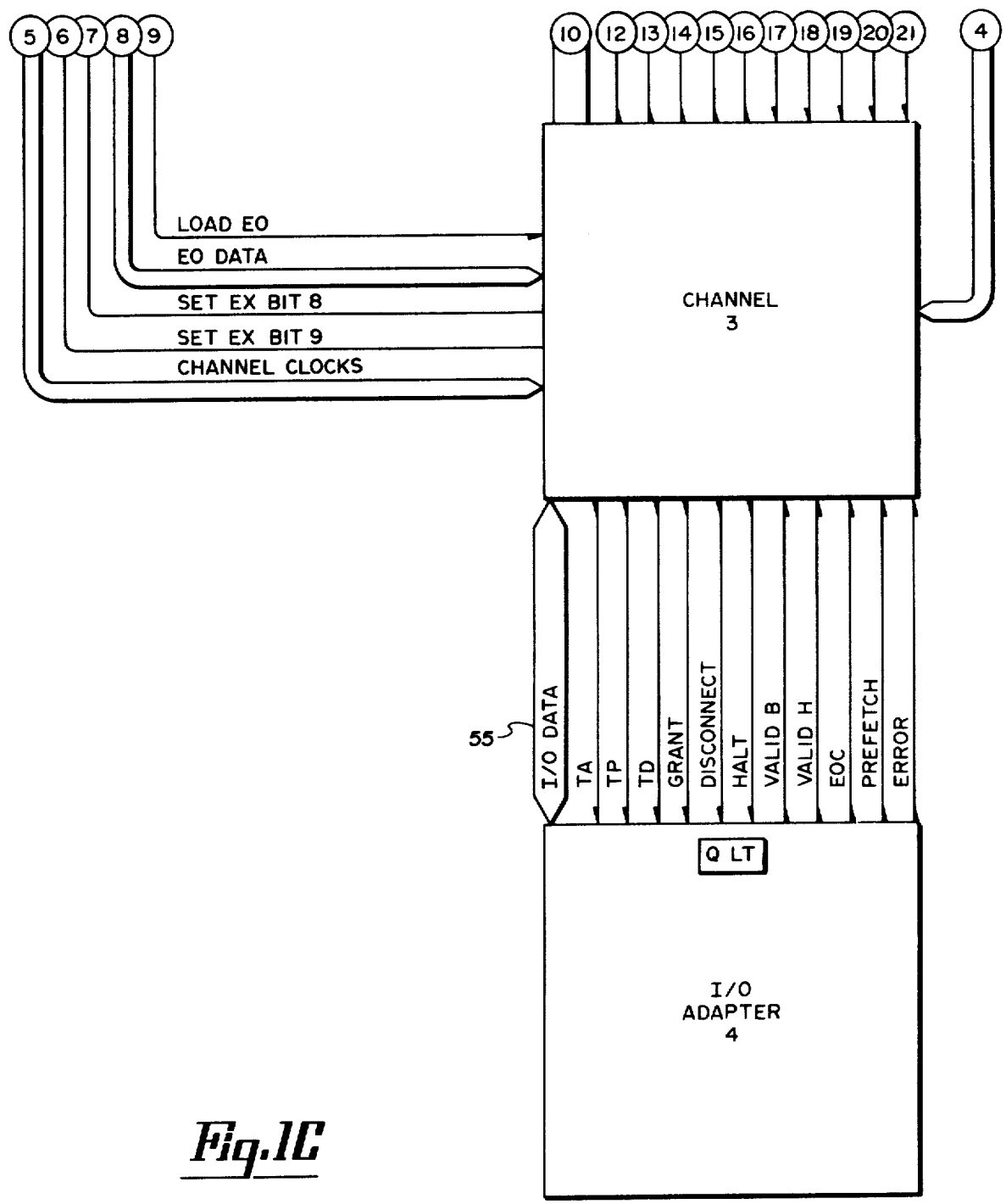
Figure 2A:
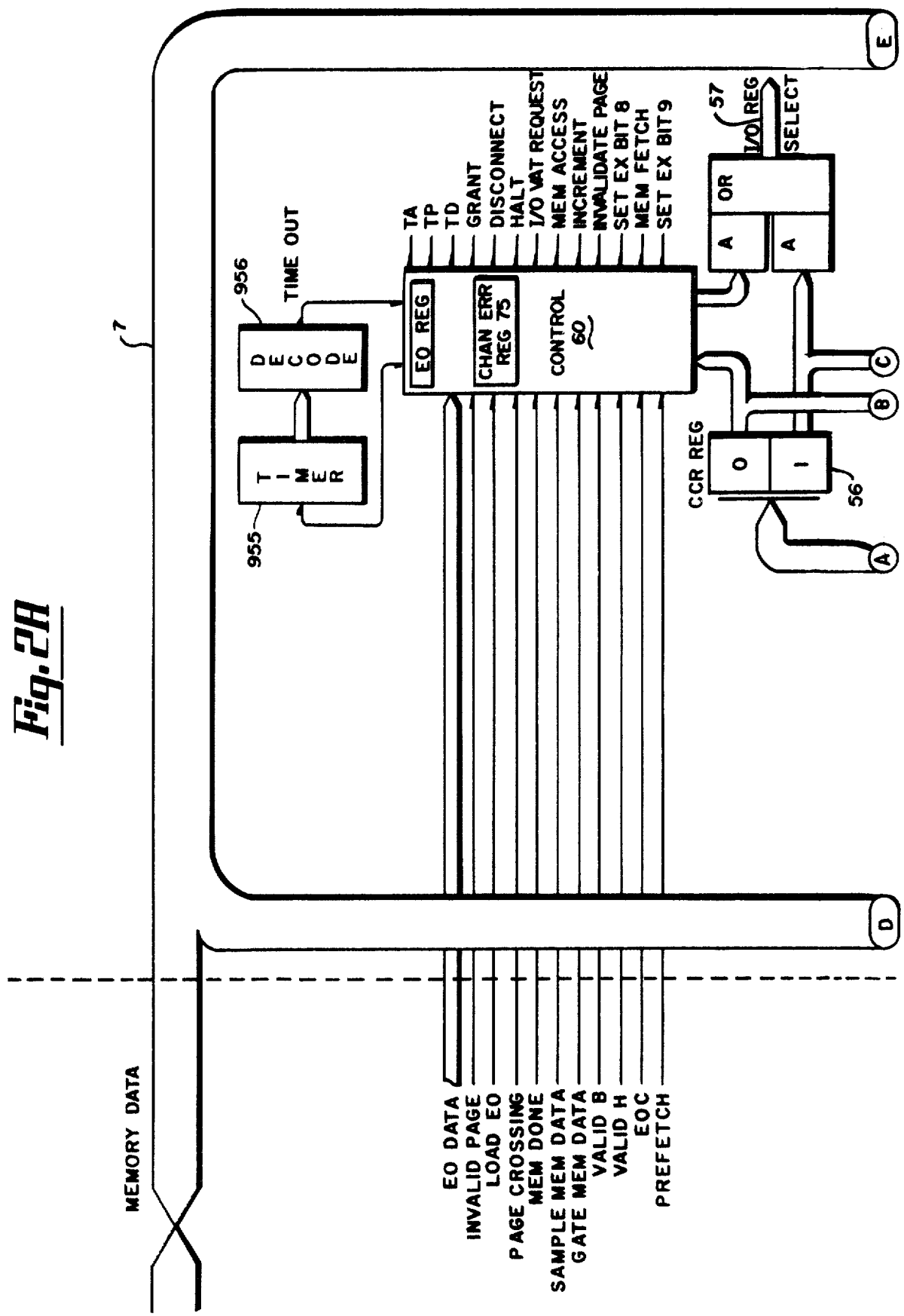

FIG. 16 is a block schematic and flow diagram of the channel circuitry driving the control lines from the channel 3 to the VAT 2 and the CPU 1. As seen in FIG. 16, this circuitry includes: gated latches 200-207; AND gates 222-254 and 270-271; OR gates 279-287; and NOT gates 274-278 and 290-299.

Figure 12B:
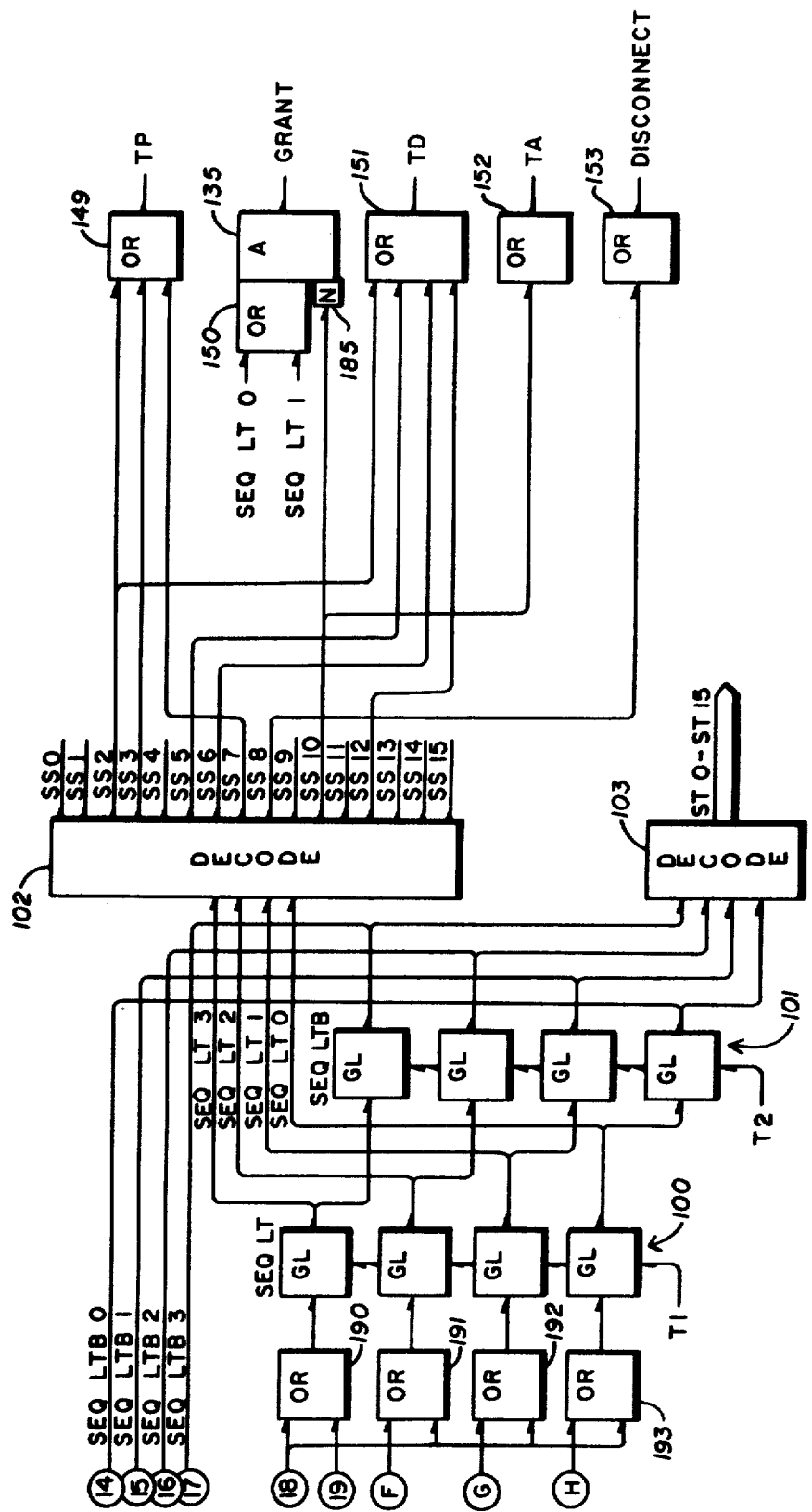
Figure 13A:
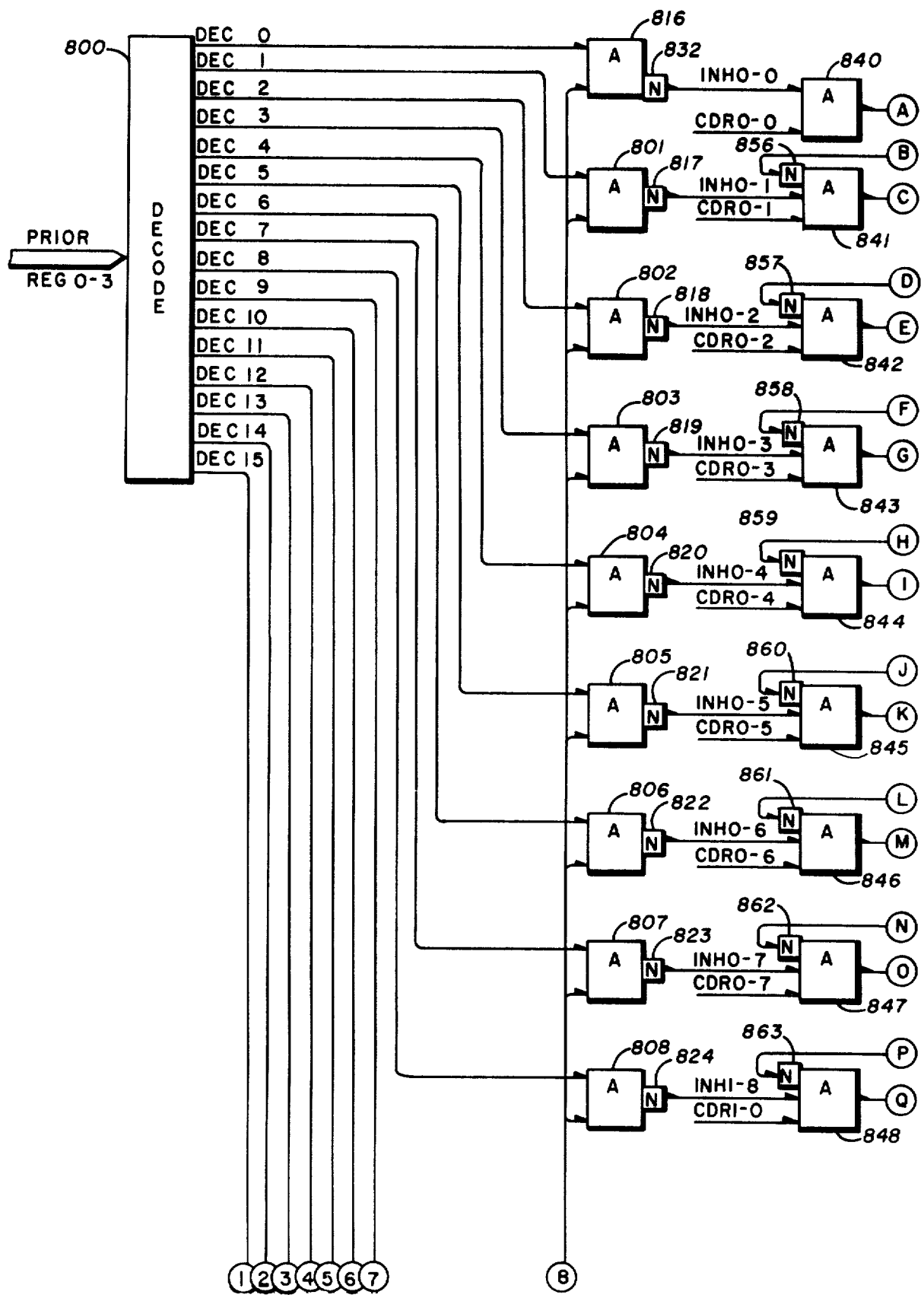
Figure 13B:
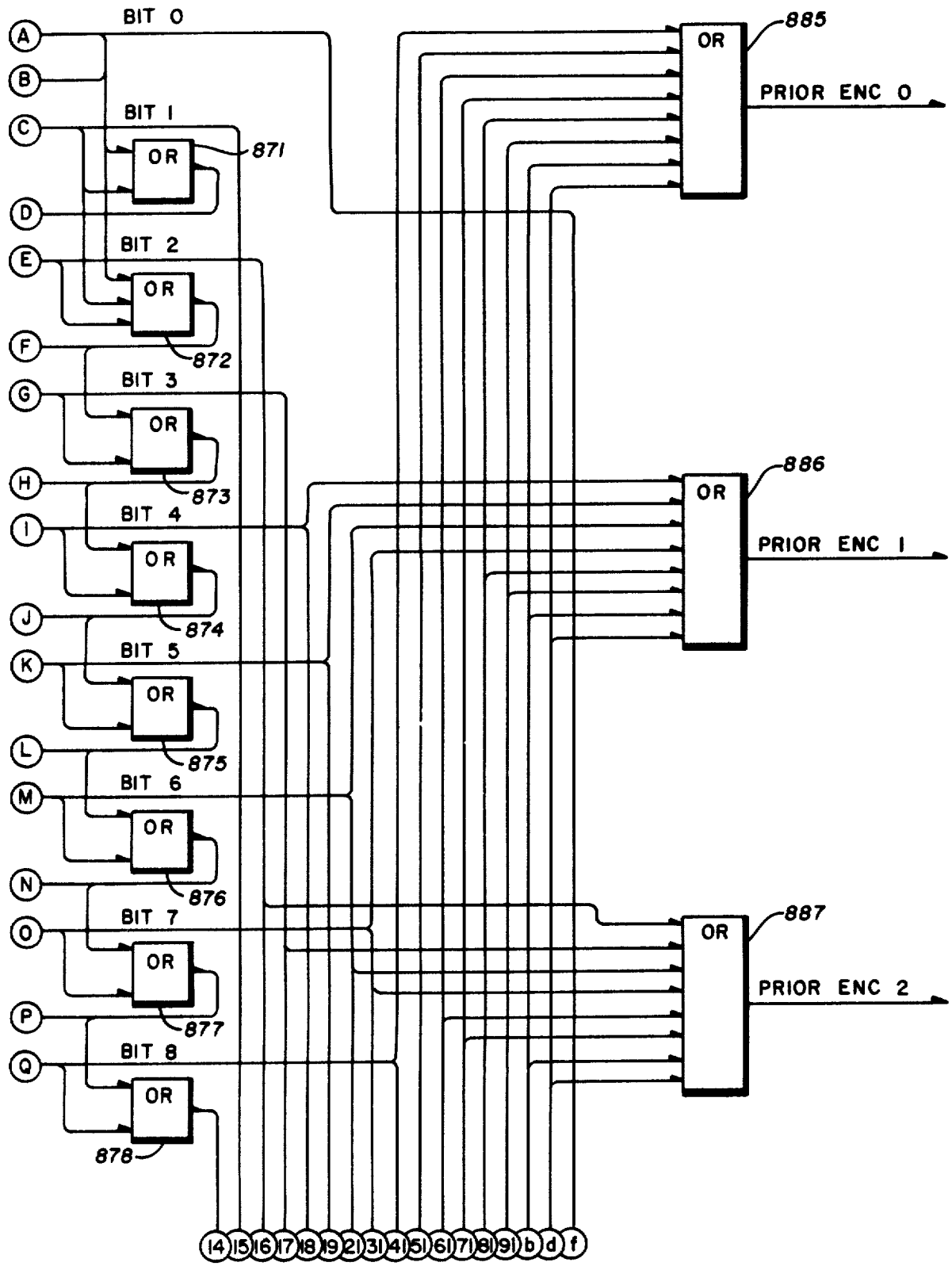
Figure 130:
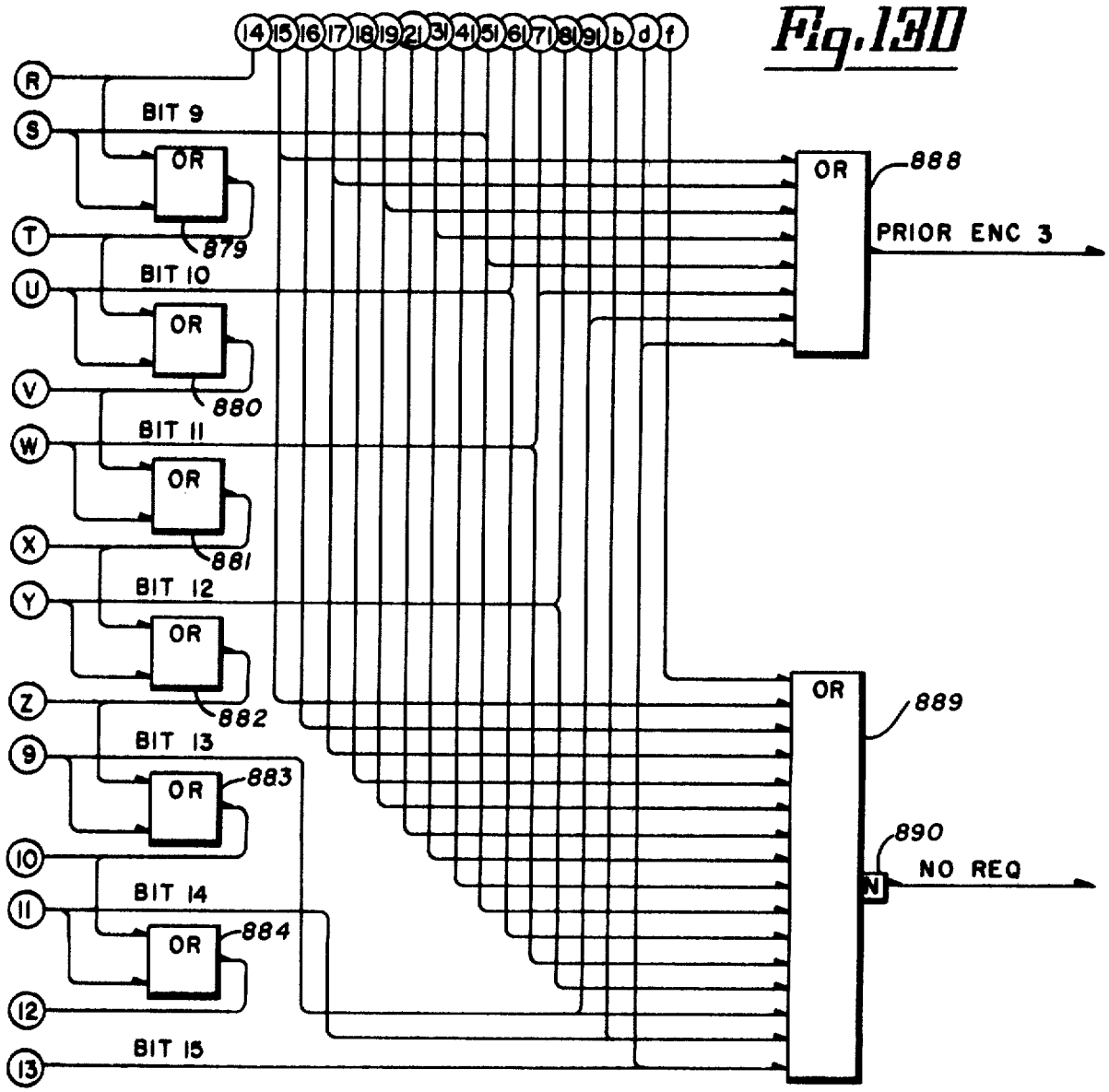

Referring now to FIG. 12, it is seen that the four SEQ LT latches 100 are loaded with the active or inactive states prevailing on the output lines of OR gates 190-193 when the T1 clock pulse appears at their parallel-connected sample inputs. Similarly, the four SEQ LTB latches 101 are loaded with the active or inactive states prevailing on the output lines of the SEQ LT latches 100 when the T2 clock pulse appears at their parallel-connected sample inputs. Each of the SEQ LT and SEQ LTB latches 100, 101 may be viewed as a four-bit register. In this discussion the uppermost of each of the sets of four latches (as viewed in FIG. 12B) is referred to as representing the third order ($2^3$) bit. The next to the uppermost latch represents the second order ($2^2$) bit, and so forth, in descending order through the first and zeroth order bits. Accordingly, when the SEQ LT and SEQ LTB latches 100, 101 are loaded with a value of eleven, each set of latches has its third, first and zeroth order bits active, while the second order bits are inactive. When the latches are loaded with a value of two, only the first order latches are active. It should also be noted that the SEQ LTB 0-3 lines feed back into AND gates 141, 143, 145 and 147 such that the SEQ LT latches 100 are reloaded with their previous value (held in the SEQ LTB latches 101) unless degating occurs in one of the NOT gates 181-184.

To communicate to an I/O adapter 4, the CPU 1 first forms an I/O command in addressable memory 5. As indicated above in connection with discussion of the Start Device Sequence, means connected to the CPU 1 present the command to the I/O adapter 4 by loading the address of the command into the I/O command register for the I/O adapter 4. This is done by specifying the appropriate I/O command register code on the CPU I/O REG SELECT bus 58, loading the VAT Register 401 from the CPU IN bus 15 and activating the CPU REQ line to the VAT 2. In response, the VAT control 402 stores the address of the I/O command in the specified I/O command register via the bus 91. The same means next loads the address of the I/O adapter data into a designated I/O data register in the same manner. Finally, this same means loads the address of the I/O command into the Start Device Register so that the channel hardware can locate the I/O command. Having loaded these I/O address registers, the CPU 1 will next load the EO Register in the channel control 60 (FIG. 2) to inform the channel 3 that a command is pending.

Before attempting to issue any additional commands to the channel 3, the CPU 1 checks the contents of the Start Device Register. If the Valid Page bit is on, the CPU 1 must wait to issue another command, because the channel 3 has not finished the previous command. If the Valid Page bit in the Start Device Register is off, then the CPU 1 can load the Start Device Register with the address of a new command and then load the EO Register, to inform the channel 3.

The two ways in which an I/O adapter 4 may handle a CPU-issued I/O command from memory 5 were introduced previously in the discussion of the Start Device Sequence. As stated in that discussion, the I/O adapter 4 may take the command without delay (Immediate Command) or queue the command for later acceptance (Command Queuing).

If an I/O adapter 4 controls many I/O devices, the I/O adapter 4 will normally use the Command Queuing option. This allows the I/O adapter 4 to fetch the command later, at a convenient time for the I/O adapter 4. The I/O adapter 4 uses its I/O command register, loaded with the command address, to fetch the I/O command.

If, however, the I/O adapter 4 controls only one I/O device, the I/O adapter 4 can use the Immediate Command option and obtain the I/O command directly from the channel 3 by using the Start Device Register. In this case, the adapter's I/O command register is not needed. A description of the channel logic for these two options follows, preceded by a logic description of the Start Device Sequence which is common to both options.

Start Device Sequence—The Start Device Sequence starts with the CPU 1 loading the EO Register, comprising latches EO-0, EO-1 and EO-2 200–202, by means of the LOAD EO line and the EO DATA 0–2 lines conditioning AND gates 223, 225, and 224 (FIG. 16). The EO-2 latch 202, when set, indicates that the Start Device Register in the VAT I/O Registers 6 contains the address of a command to an I/O adapter 4.

At the time the CPU 1 raises the LOAD EO and EO DATA 0–2 lines, the SEQ LT and SEQB LT latches 100 and 101 would normally be in the poll state and contain a value of two. This means that the SS2 and ST2 lines are active via Decodes 102 and 103. SS2 active causes the TP and TD lines to become active by means of OR gates 149 and 151 (FIG. 12). SS2 being active also causes the value in the Slice Counter Register, SLC CTR 0-3, 53A–53D to be gated by means of OR gate 212 and AND gates 260–263 and Parity generator 268 (FIG. 14) via PR CTR 0–3, P0 onto the I/O DATA bus bits 0–7, parity P0, by means of AND gate 349 and OR gates 427 and 429 (FIG. 15). At the next T4 clock pulse, ST2 being active causes a value of hexadecimal '90' (memory fetch, increment, ignore page crossing) to be loaded in the CCR0 Register 56A by means of AND gates 326 and 327 and OR gate 423. AND gate 340 causes a value of hexadecimal '01' to be gated into the CCR1 Register 56B. Both of these values, '90' and '01', are obtained by means of registers forced to these values which are connected to the appropriate AND gates, as shown symbolically in FIG. 15. ST2 being active also causes the BYTE LT latch 302 to be reset by means of AND gate 317 and OR gate 414 and the BYTE CTR 0–1 triggers 363 and 364 to be reset by AND gate 311 and OR gate 412. The BYTE CNT 0 line becomes active.

After the channel 3 has transferred the time slice over the I/O DATA bus, the channel 3 checks for a request by the I/O adapter 4. This sequence is as follows. At the next T1 clock pulse, ST2 being active causes a value of three to be loaded into the SEQ LT latches 100 by means of OR gate 147 and AND gate 134. A value of three in the SEQ LT latches 100 causes the SS3 line to become active from Decode 102. SS3 being active causes the TP line to become active by means of OR gate 149.

Because SS2 becomes inactive, the data from the Slice Counter Register 53 (SLC CTR 0-3, 53A-53D, FIG. 14) is removed from the I/O DATA bus, so that the adapter priorities can be transmitted.

At the next T2 clock pulse, the SEQ LTB 101 latches are loaded from the SEQ LT latches 100, causing ST3 from Decode 103 to become active. At clock pulse T3, the data on the I/O DATA bus, 0–15, P0, P1, i.e., the I/O adapter priority requests, is gated to the CDR0 and CDR1 Registers 50A, 50B by means of OR gates 417, 418, 422, 437, 424 and 425, AND gates 319, 331, 337, 320, 322, and 338 and NOT gate 451. At the next T4 clock pulse, the data from the CDR0 and CDR1 Registers 50A, 50B is gated to the Priority Encode 52, which encodes a 16 bit input, CDR0-0 to CDR1-7, to a four bit encode, PRIOR ENC 0–3, (FIG. 13). The four-bit encode will be the encode of the highest priority bit of the 16 input bits, because all of the INH 0—0 to INH 0-15 lines are on until the RETRY latch 896 is set.

The four-bit encode from the Priority Encode 52 is loaded into the Priority Register 54 (FIG. 14). Assuming, as an example, that no I/O adapter requested use of the channel 3, no adapter priorities will have been raised, and the NO REQ line from the Priority Encode 53 will be active. The NO REQ line being active causes the Slice Counter Register 53 (SLC CTR 0-3, 53A-53D) to be incremented by 1 (or reset to 0, if the POLL LMT Register 70 is found by the comparator 213 to equal the contents of the Slice Counter Register 53). The NO REQ line being active causes the START UP latch 204 to be set by means of AND gates 228 and 229, OR gate 280 and NOT gate 291 (FIG. 16).

Because, by assumption, there were no I/O adapter requests, and further assuming that the CPU 1 has prepared a command as outlined above, the channel 3 will now fetch the device (or adapter) address of the command from memory 5 using the Start Device Register. As stated above, the CCR0 and CCR1 Registers, 56A, 56B, contain a value of '9001' which, when the bits are decoded as specified in FIG. 4, means that a main store fetch is to be done using the Start Device Register.

At the next T1 clock pulse, a value of one is loaded into the SEQ LT latches 100 by means of AND gates 117 and 133, OR gate 146, and NOT gate 183, causing SS1 to become active from Decode 102 (FIG. 12).

MEM BUSY LT latch 205 is also set at this time by means of AND gates 228, 236, 237 and OR gates 281 and 282. MEM BUSY LT latch 205 being set causes the I/O VAT REQUEST, MEM ACCESS, INCREMENT, and MEM FETCH lines to become active, by means of AND gates 242, 244, 248, 252, and 247, NOT gate 297, and OR gates 284, 286 and 285 (FIG. 16). The channel 3 also designates the Start Device Register to the VAT 2 by gating the contents of the CCR1 Register 56B (the hexadecimal '01' is the code for this register) to the VAT 2 by means of AND gates 354 to 361 and 347 (FIG. 15).

Referring now to FIG. 3, the I/O VAT REQUEST line being active causes the VAT 2 to select the I/O register designated on the I/O REG SELECT bus 57 from the VAT I/O Registers 6. The contents of the Start Device Register (a main memory address plus a Valid Page bit) is placed in the VAT Register 401. Because the INCREMENT line is active, the VAT control 402 increments the address in the VAT Register 401 by four and stores the updated result back into the Start Device Register. Since the MEM ACCESS line is active, the VAT control 402 gates the (unincremented) memory address from the VAT Register 401 to the memory 5. The VAT 2 then activates the MEMORY FETCH line to the memory 5 since the MEM FETCH line from the channel 3 is active.

When the data has been fetched from memory 5, the VAT 2 activates the SAMPLE MEM DATA line to the channel 3 from the VAT control 402. The SAMPLE MEM DATA line being active causes the contents of the MEMORY DATA bus 7 to be loaded into the CDR register 50 (CDR0-CDR3, 50-50D) at the next C1 clock pulse, by means of AND gates 330, 335, 363, 377, 321, 339, 366, and 380, and OR gates 418, 422, 425, 424, 431, 430, 435 and 434 (FIG. 15).

After activating the SAMPLE MEM DATA line to the channel 3, the VAT 2 activates the MEM DONE line to the channel 3. The MEM DONE line being active causes the MEM DONE LT latch 206 to be set by means of AND gate 239 and OR gate 283 at a C1 clock pulse. The MEM DONE LT latch 239 becoming set causes the MEM BUSY LT latch 205 to be reset by means of AND gates 236 and 238, OR gate 282, and NOT gate 294 at a T4 clock pulse. Resetting of the MEM BUSY LT latch 238 causes the I/O VAT REQUEST, MEM ACCESS, INCREMENT, and MEM FETCH lines to become inactive and the Start Device Register code to be removed from the I/O REG SELECT bus 57.

At the next T1 clock pulse, the MEM BUSY LT latch 205 being reset causes a value of ten to be gated into the SEQ LT latches 100 by means of AND gates 131, 133, 134, and 110, OR gates 141, 145, and 148 and NOT gates 184 and 160. Also at T1 clock time, the EO-2 latch 202 is reset by means of AND gates 222 and 226, NOT gate 290 and OR gate 279. A value of 10 in the SEQ LT latches causes SS10 from the Decode 102 to become active. SS10 being active causes a tag signal on the TA tag line to the I/O adapter 4 to become active by means of OR gate 152. Also at T1 clock time the data from the CDR Register 50 (CDR0-CDR3, 50A-50D) is loaded into the CDRB Register 56 (CDRB0-DCRB3, 51A-51D). SS10 being active causes the data from the CDRB0 Register 51A to be gated onto the I/O DATA bus bits 0-7, parity P0, by means of AND gates 344 and 350 and OR gates 428 and 429. The channel interface now has the TA tag line active and an I/O device/adapter address on the I/O DATA bus, because, by convention, byte zero of the command is a device address.

At the next T3 clock pulse, the channel 3 will sample the VALID B, VALID H, EOC and PREFETCH lines from the I/O adapter 4. All I/O adapters examine the device address and the I/O adapter 4 recognizing its address will have activated the VALID B (if byte adapter) or VALID H (if halfword adapter) line to indicate that the I/O adapter 4 has recognized and accepted the device address data.

At the time of issuing this first acceptance signal, the I/O adapter 4 determines whether the I/O command will be fetched at a later time (command is queued) or whether the I/O adapter 4 will accept the command immediately. The details of each of these options is explained next, with further reference to FIGS. 1, 2, 3, 4 and 12-16.

Command Queuing—If the I/O adapter 4 is to fetch the command at a later time, it activates the EOC line along with the VALID B or VALID H line. For this example, it is assumed that the I/O adapter 4 is a byte adapter, i.e., the I/O adapter 4 sends data only on I/O DATA bus bits 0-7, parity P0, and ignores bits 8-15, parity P1. Accordingly, all further discussion will refer to use of the VALID B line. The active EOC line serves as a termination signal to the channel 3 and signals that the Command Queuing option is being taken. Accordingly, the I/O adapter 4 stores internally an indication that the termination signal was transmitted and that an I/O command for this adapter is now pending. This indication may be stored in a latch or other suitable means, such as the Q LT latch shown in FIG. 1.

The VALID B and EOC lines from the I/O adapter 4 are sampled by the channel 3 at the next T3 clock pulse, causing the EOC LT latch 104 (FIG. 12) and the VALID B latch 300 (FIG. 15) to be set.

At the next T1 clock pulse, the SEQ LT latches 100 are loaded with a value of zero by means of AND gates 115, 131 and 133, OR gates 142 and 146 and NOT gates 181 and 183. The MEM BUSY LT latch 205 is also set at T1 clock time by means of AND gates 234, 236 and 237 and OR gates 281 and 282. MEM BUSY LT latch 205 being set causes the I/O VAT REQUEST line to become active by means of AND gates 242 and NOT gate 297.

Loading a value of 0 into the SEQ LT latches 100 causes the SS10 line from Decode 102 to become inactive and the SS0 line to become active. SS10 becoming inactive causes the TA tag line to become inactive and the device address to be degated from the I/O DATA bus bits 0-7, parity P0 (FIGS. 12 and 15). SS0 becoming active causes the INVALIDATE PAGE line to become active by means of AND gates 242 and 254 and OR gate 287 (FIG. 16). SS0 becoming active also causes the contents of the CCR1 Register 56B to be gated onto the I/O REG SELECT bus 57 to the VAT 2 by means of AND gates 354 to 361 and 347 (FIG. 15).

Referring now to FIG. 3, the VAT 2, upon detecting the I/O VAT REQUEST line becoming active, selects the Start Device Register (designated by the contents of CCR1 Register 56B) from the VAT I/O Registers 6 and stores the contents of the Start Device Register into the VAT Register 401. Because the INVALIDATE PAGE line is active, the VAT control 402 sets the Valid Page bit off in the contents of VAT Register 401, and stores the modified contents of the VAT Register 401 back into the Start Device Register. The VAT 2 then activates the MEM DONE line to the channel 3. When the CPU 1 checks the Valid Page bit and finds it off, it recognizes that the I/O adapter has finished with the command.

At the next C1 clock pulse, the channel 3 sets the MEM DONE LT latch by means of AND gate 239 and OR gate 283 (FIG. 16). At the next T3 clock pulse the VALID B and EOC LT latches 300, 104 are reset, because the VALID and EOC lines are now inactive. At the next T4 clock pulse, the channel 3 resets the MEM BUSY LT latch 205 by means of AND gates 236 and 238, OR gate 282 and NOT gate 294. Resetting the MEM BUSY LT latch 205 causes the I/O VAT REQUEST and INVALIDATE PAGE lines and the I/O REG SELECT bus 57 to become inactive.

At the next T1 clock pulse, the SEQ LT latches 100 are loaded with a value of two by means of AND gates 140, 126 and 133, OR gate 145 and NOT gates 171 and 172. When the SEQ LT latches 100 contain a value of two, the SSO line becomes inactive from Decode 102 and the SS2 line becomes active. The TP line becomes active via OR gate 149. The channel 3 is now back in the Channel Poll Sequence. At the next T4 clock pulse, the START UP LT latch 204 is reset by means of AND gate 229 and NOT gate 291.

Immediate Command—If the I/O adapter 4 is to accept the command immediately, it activates both the VALID B line and the PREFETCH line. The PREFETCH line being active indicates that more than one block of four bytes of the command will be fetched from memory 5. This line allows overlapping of data fetches from memory 5 with data transfers from the channel 3 to the I/O adapter 4. The absence of an activated EOC line indicates to the channel that the command is not to be queued but rather taken immediately.

The VALID B latch 300 (FIG. 15) and the PREFETCH latch 203 (FIG. 16) are set at the next T3 clock pulse. At the next T4 clock pulse the BYTE LT latch 302 is set by means of AND gates 314 (ST10 is active) and 317 and OR gates 413 and 414 (FIG. 15). At the next T1 clock pulse, the SEQ LT latches 100 are loaded with a value of twelve by means of AND gates 125, 132, and 133, OR gates 143 and 146 and NOT gates 179 and 183. A value of twelve in the SEQ LT latches 100 causes the SS10 line from Decode 102 to become inactive and the SS12 line to become active.

SS10 becoming inactive causes the TA tag line to become inactive and the device address to be removed from the I/O DATA bus bits 0-7, parity P0. SS12 being active causes the TD and GRANT lines to become active by means of AND gate 135, OR gates 150 and 151 and NOT gate 185 (FIG. 12). The data in the CDRBO Register 51A (the device address) is gated onto the I/O DATA bus, bits 0-7, parity P0, by means of AND gates 344 (BYTE CNT 0 is still active) and 350 and OR gates 429 and 428.

Referring now to FIG. 16, also at the T1 clock pulse, the MEM BUSY LT latch 205 is set by AND gates 227, 237 and 236, OR gates 281 and 282 and NOT gate 294. The MEM BUSY LT latch 205 being set causes the I/O VAT REQUEST, MEM ACCESS, INCREMENT, and MEM FETCH lines to become active by means of AND gates 242, 246, 248, 244 and 250, OR gates 285, 284 and 286 and NOT gates 278, 299 and 275. The contents of the CCR1 Register 56B, specifying the Start Device Register, is gated to the I/O REG SELECT bus 57 by means of AND gates 354 to 361 and 347 and NOT gate 452 (FIG. 15). In this way the channel 3 instructs the CPU to begin the fetch of the second four bytes of the command while the first four are transferred to the I/O adapter 4.

Referring now to FIG. 3, the VAT 2 selects the contents of the Start Device Register from the VAT I/O Registers 6 and loads the contents into the VAT Register 401. Because the INCREMENT line is active, the VAT control 402 increments the contents of the VAT Register 401 by four (to update it for the next data transfer) and stores the result back into the Start Device Register. The MEM ACCESS line being active causes the VAT 2 to gate the (unincremented) contents of the VAT Register 401 to the memory 5 via AND gate 92, conditioned by the MEM FETCH and GATE MEM ADDR lines. The VAT 2 then activates the MEMORY FETCH line to the memory 5. The memory 5 fetches the data at the specified address and places it on the MEMORY DATA bus 7. The VAT 2 activates the SAMPLE MEM DATA line to the channel 3, causing the data on the MEMORY DATA bus 7 to be stored in the CDR0 to CDR3 Registers 50A-50D at the next C1 clock pulse by means of AND gates 330, 321, 335, 339, 363, 366, 377 and 380 and OR gates 418, 422, 424, 425, 430, 431, 434 and 435 (FIG. 15). The VAT 2 then activates the MEM DONE line, causing the MEM DONE LT latch 206 to be set at the next C1 clock pulse, by means of AND gate 239 and OR gate 283 (FIG. 16). The MEM DONE LT latch 206 being set causes the MEM BUSY LT latch 205 to be reset by means of AND gates 238 and 236, OR gate 282 and NOT gate 294 at the next T4 pulse. The MEM BUSY LT latch being reset causes the I/O VAT REQUEST, INCREMENT, MEM ACCESS and MEM FETCH lines to become inactive. The Start Device Register is also removed from the I/O REG SELECT bus 57.

Referring again to FIG. 15, at the next T4 clock pulse following setting of the MEM BUSY LT latch, the WAIT LT latch 303 is set, preventing the next four bytes of data from being loaded from the CDR0-CDR3 Registers, 50A-50D, into the CDRB0-CDRB3 Registers, 51A-51D, (which already hold the first four bytes of the command, as a result of the Start Device Sequence) until all of the data from the CDRB0 to CDRB3 Registers, 51A-51D, has been transferred to the I/O adapter 4. The WAIT LT latch is set by means of AND gates 367 and 369 and OR gate 432.

While the next memory access is being performed for the channel 3, the channel 3 is continuing transfer of the first four bytes of data (the command) from the CDRB0 to CDRB3 Registers, 51A-51D, to the I/O adapter 4 over the I/O DATA bus, as follows.

The previous T1 clock pulse the first byte of the command was placed on the I/O DATA bus bits 0-7, P0. At the next following T2 clock pulse, the SEQ LTB latch 101 was loaded with a value of twelve causing the ST12 line from Decode 103 to become active. At the next following T3 clock pulse, the VALID B line being active (because the I/O adapter 4 has already accepted the first byte of data) caused the VALID B latch 300 to be set (FIG. 15). Because the I/O adapter 4 will only transfer eight bytes of data (the length of a command), the I/O adapter 4 deactivates the PREFETCH line, causing the PREFETCH latch 203 to be reset, also at T3 (FIG. 16).

The VALID B latch 300 being set causes the BYTE CTR 0 and BYTE CTR 1 triggers 363, 364 to be incremented by one at the trailing edge of the next T1 clock pulse, to access the second byte in the CDRB Register 51 (CDRB1, 51B). The BYTE CTR 0 and 1 triggers are incremented by means of AND gate 310 and OR gate 410. The BYTE CTR 0 and 1 triggers 363, 364 now contain a value of one, which causes the BYTE CNT 1 line from Decode 304 to become active. The second byte of data, from the CDRB1 Register 51B, is gated to the I/O DATA bus, bits 0-7, parity P0, by means of AND gates 345 and 351 and OR gate 429.

The next T3 clock pulse, the I/O adapter 4 activates the VALID B line to indicate that the second data byte was received. As a result, the VALID B latch 300 is set, causing the BYTE CTR 0 and 1 triggers 363, 364 to be incremented by one, at the next T1 clock pulse, to a value of two, by means of AND gates 310 and 316 and OR gates 410 and 415. A value of two in the BYTE CTR 0 and 1 triggers 364, 363 causes the BYTE CNT 2 line from Decode 304 to become active. BYTE CNT 2 becoming active causes the data in the CDRB2 Register 51B to be gated onto I/O DATA bus bits 0-7, parity P0, by means of AND gates 346 and 353 and OR gate 429. At the next T3 clock pulse, the I/O adapter 4 activates the VALID B line to indicate the third byte of data was received by the I/O adapter 4. At the trailing edge of the next T1 clock pulse, the BYTE CTR 0 and 1 triggers 363, 364 are incremented by one to a value of three, by means of AND gates 310 and 316 and OR gates 410 and 415. A value of three in the BYTE CTR 0 and 1 triggers 363, 364 causes the BYTE CNT 3 line from Decode 304 to become active. The CDR FULL line also becomes active by means of OR gate 416. The data in the CDRB3 Register 51C will then be gated onto the I/O DATA bus, bit 0-7, parity P0, by means of AND gates 370 and 352 and OR gate 429.

At the next T3 clock pulse, the I/O adapter 4 activates the VALID B line, indicating that the I/O adapter 4 has accepted the fourth byte of data. Th VALID B latch 300 is set, causing the VALID line to become active by means of OR gate 411. At the next T4 clock pulse, the WAIT LT latch 303 is reset by means of AND gates 324 and 369, OR gates 421 and NOT gate 453.

At the next T1 clock pulse, the data in the CDR Register 50 (CDR0-CDR3, 50A-50D) are loaded into the CDRB Register 51 (CDRB0-CDRB1, 51A-51D) by means of AND gates 332, 343, 371 and 382 and NOT gates 445-458.

Also at T1 clock time (trailing edge), the BYTE CTR 0 and 1 triggers 363, 364 are incremented by one. Accordingly, they roll over to a value of zero, causing the BYTE CNT 0 line from Decode 304 to become active. The next byte of data (the fifth byte of the I/O command) is gated to the I/O DATA bus, bits 0-7, parity P0, by means of AND gates 344 and 350 and OR gates 428 and 429. The sixth, seventh, and eighth bytes are sent to the I/O adapter in the same manner as the second, third and fourth bytes of data, by means of the same gates as described previously.

When the eighth byte of data is received by the I/O adapter 4, the I/O adapter 4 activates the VALID B and EOC lines to indicate that no more data transfers are to take place. At the next T3 clock pulse, the VALID B latch 300 (FIG. 15) and EOC LT latch 104 (FIG. 12) are set. At the next T1 clock pulse, the SEQ LT latches 100 are loaded with a value of zero, by means of AND gates 114, 131 and 132, OR gates 142 and 144 and NOT gates 181 and 182, causing the SS0 line to become active from Decode 102. SS0 becoming active causes the TD and GRANT lines to become inactive and the data from the CDRB3 Register 51D to be removed from the I/O DATA bus, bits 0-7, parity P0.

Also at this T1 clock pulse, the MEM BUSY LT latch 205 is set by means of AND gates 236, 235 and 237, OR gates 281 and 282 and NOT gate 294. The MEM BUSY LT latch 205 being set causes the I/O VAT REQUEST line and INVALIDATE PAGE line to become active by means of AND gates 242 and 254 and OR gate 287. The contents of the CCR1 Register 56B, specifying the Start Device Register, is gated to the I/O REG SELECT bus 57 by means of AND gates 354 to 361 and 347.

The VAT 2 selects the contents of the Start Device Register and loads the contents into the VAT Register 401. The VAT control 402 then resets the Valid Page bit in the contents of VAT Register 401 (because the INVALIDATE PAGE line is active) and stores the contents back into the Start Device Register. The VAT 2 then activates the MEM DONE line to the channel 3. The reset (off) Valid Page bit will indicate to the CPU 1 that the I/O adapter has finished with the command.

At the next C1 clock pulse, the MEM DONE LT latch 206 is set by means of AND gate 239 and OR gate 283. At the next T4 clock pulse, the MEM BUSY LT latch is reset by means of AND gates 236 and 238, OR gate 282 and NOT gate 294. The MEM BUSY LT latch 205 being reset causes the I/O VAT REQUEST and INVALIDATE PAGE lines to become inactive.

At the next T1 clock pulse, a value of two is loaded into the SEQ LT latches 100 by means of AND gates 126 and 133 and OR gate 145. The channel 3 is now back in the Channel Poll Sequence searching for an I/O adapter 4 that requires use of the channel 3 or waiting for another command from the CPU 1 to be sent to an I/O adapter 4. At the next T4 clock pulse, the START UP LT latch 204 is reset by means of AND gate 229 and NOT gate 291.

From the foregoing it is seen that the present apparatus for transferring I/O commands permits an I/O adapter to either immediately accept the command presented to it by the channel or to queue the command so that it can be fetched by the I/O adapter on its own initiative. When the CPU presents a command to the I/O adapters the channel first sends out device address data to identify the adapter to which the command is directed. The adapter recognizing its device address sends the channel a first acceptance signal, indicating acceptance of the device address. If the I/O adapter 4 also sends a termination signal, this indicates that the command is to be queued. If the termination signal is not sent, this indicates that the command is to be taken immediately. When a command is to be queued, the I/O adapter stores an indication that a termination signal was sent and a command is pending. In this case, the adapter will fetch the command later by initiating a data transfer sequence, when it is free to do so and when the channel grants it the channel interface in response to a request for service. A standard data transfer sequence is used to fetch a queued command. That is, the memory fetch operation is essentially the same whether the I/O adapter is performing a fetch of data or a queued command.

It is further seen from the foregoing that the present apparatus permits an I/O adapter to delay processing of commands without the need for command buffers. In addition, the I/O adapter need not wait for the delayed command to be resent, but rather may initiate processing of the delayed command on its own.

While the preferred embodiment of the invention has been illustrated and described, it is to be understood that the invention is not limited to the precise construction herein disclosed, and the right is reserved to all changes and modifications coming within the scope of the invention as defined in the appended claims.

Having thus described the invention, what is claimed as new, and desired to be secured by Letters Patent is:

1. In apparatus for transferring input-output (I/O) commands, including device address data and command data, to I/O adapters connected to I/O devices in a computer system having an addressable storage for storing instructions, data and I/O commands, a central processing unit (CPU) operable to fetch instructions from storage and execute said instructions, and channel means for managing and transferring I/O commands connecting the I/O adapters to the storage and the CPU, the improvement comprising:

an I/O command register;

an I/O start device register;

means connected to the CPU for loading the I/O command register and the I/O start device register with an address of an I/O command;

control means in the channel means for accessing the storage at a location specified by the address in the I/O start device register and for transferring device address data accessed from the storage to the I/O adapters, said control means providing the I/O adapters with a first tag signal;

means in the I/O adapters responsive to the first tag signal for examining the device address data transferred from the control means and determining if the device address data is to be accepted;

means in the I/O adapters for transmitting a first acceptance signal to the control means upon determining that the device address data is to be accepted;

means in the I/O adapters for determining if command data is to be accepted and for transmitting a termination signal to the control means upon determining the command data is not to be accepted, said control means being responsive to the termination signal to terminate the first tag signal and leave the I/O command pending; and means in the I/O adapters for storing an indication that the termination signal was transmitted to indicate to an I/O adapter sending the termination signal that an I/O command is pending.

2. The apparatus of claim 1 wherein said control means, following transfer of device address data, is responsive to a first acceptance signal and the absence of a termination signal to transfer command data accessed from storage to an I/O adapter which transmits a first acceptance signal upon determining that the device address data is to be accepted.

3. The apparatus of claim 1 further comprising means in the I/O adapters for causing the control means to access storage for a command at a location specified by the address in the command register when an I/O adapter has an indication than an I/O command is pending and the adapter does not currently require a data transfer.

4. The apparatus of claim 1 wherein the means in the I/O adapters for examining the device address data and determining if it is to be accepted comprises means for comparing a device address assigned to an I/O adapter with the device address data.

5. The apparatus recited in claim 1 wherein the improvement further comprises completion indicating means in the channel means for indicating to the CPU either that a termination signal has been transmitted by an I/O adapter or that transfer of command data to an I/O adapter has occurred following the first tag signal.

6. The apparatus of claim 5 wherein the completion indicating means comprises a field in the I/O start device register.

* * * * *